(12) United States Patent
Cote et al.

(10) Patent No.: US 12,044,894 B2
(45) Date of Patent: Jul. 23, 2024

(54) MULTIPORT ASSEMBLIES INCLUDING MOUNTING FEATURES OR DUST PLUGS

(71) Applicant: CORNING RESEARCH & DEVELOPMENT CORPORATION, Corning, NY (US)

(72) Inventors: Monique Lise Cote, Mont-Saint-Hilaire (CA); Edward Wilson Licitra, Decatur, GA (US); Cameron Meyer, Lewisville, TX (US); Matthew Wallace Peterson, San Francisco, CA (US); Radawan Ripumaree, Hickory, NC (US); Joel Christopher Rosson, Hickory, NC (US); Jonathan Patrick Summers, South San Francisco, CA (US); Lee Alexander Webb, Huntersville, NC (US); Dayne Wilcox, El Cerrito, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 483 days.

(21) Appl. No.: 17/357,271

(22) Filed: Jun. 24, 2021

(65) Prior Publication Data

US 2021/0318499 A1    Oct. 14, 2021

Related U.S. Application Data

(63) Continuation of application No. PCT/US2019/067781, filed on Dec. 20, 2019.
(Continued)

(51) Int. Cl.
*G02B 6/44* (2006.01)
*G02B 6/38* (2006.01)

(52) U.S. Cl.
CPC ......... *G02B 6/4441* (2013.01); *G02B 6/3825* (2013.01); *G02B 6/3831* (2013.01); *G02B 6/3849* (2013.01)

(58) Field of Classification Search
None
See application file for complete search history.

(56) References Cited

U.S. PATENT DOCUMENTS 3,792,284 A   2/1974  Kaelin
4,003,297 A   1/1977  Mott
(Continued)

FOREIGN PATENT DOCUMENTS

CN   1060911 A   5/1992
CN   1071012 A   4/1993
(Continued)

OTHER PUBLICATIONS

Liu et al., "Variable optical power splitters create new apps", Retrieved from: https://www.lightwaveonline.com/fttx/pon-systems/article/16648432/variable-optical-power-splitters-create-new-apps, 2005, 14 pages.
(Continued)

*Primary Examiner* — Jerry Rahll
(74) *Attorney, Agent, or Firm* — Michael E. Carroll, Jr.

(57) ABSTRACT

Multiport assemblies comprising one or more optical ports for receiving an external optical fiber connector for making an optical connection along with useful mounting features for securing the multiport assembly are disclosed. The multiport assembly comprises a mounting member having an aperture and a standoff that is coupled to a shell. The standoff extends outward from a lower surface of the shell to allow easy mounting to irregular surfaces. In another embodiment, the multiport assembly may comprise a second mounting member with an aperture and standoff that is
(Continued)

received in a rear shell aperture to inhibit damage to the multiport assembly if a fastener is over-tightened during mounting. In further embodiments, the multiport assembly may comprise a dust plug having a locking feature and a keying port that is received in an optical port for inhibiting dirt, dust or debris from entering when the optical port is not in use.

44 Claims, 25 Drawing Sheets

Related U.S. Application Data

(60) Provisional application No. 62/785,871, filed on Dec. 28, 2018.

(56) References Cited

U.S. PATENT DOCUMENTS

| | | | |
|---|---|---|---|
| 4,077,567 A | 3/1978 | Ginn et al. | |
| 4,413,880 A | 11/1983 | Forrest et al. | |
| 4,547,937 A | 10/1985 | Collins | |
| 4,634,858 A | 1/1987 | Gerdt et al. | |
| 4,688,200 A | 8/1987 | Poorman et al. | |
| 4,723,827 A | 2/1988 | Shaw et al. | |
| 4,994,134 A | 2/1991 | Knecht et al. | |
| 5,007,860 A | 4/1991 | Robinson et al. | |
| 5,067,783 A | 11/1991 | Lampert | |
| 5,073,042 A | 12/1991 | Mulholland et al. | |
| 5,131,735 A | 7/1992 | Berkey et al. | |
| 5,146,519 A | 9/1992 | Miller et al. | |
| 5,212,752 A | 5/1993 | Stephenson et al. | |
| 5,381,494 A | 1/1995 | O'Donnell et al. | |
| 5,408,570 A | 4/1995 | Cook et al. | |
| 5,553,186 A | 9/1996 | Allen | |
| 5,600,747 A | 2/1997 | Yamakawa et al. | |
| 5,631,993 A | 5/1997 | Cloud et al. | |
| 5,647,045 A | 7/1997 | Robinson et al. | |
| 5,673,346 A * | 9/1997 | Iwano | G02B 6/3869 385/60 |
| 5,748,821 A | 5/1998 | Schempp et al. | |
| 5,781,686 A | 7/1998 | Robinson et al. | |
| 5,782,892 A | 7/1998 | Castle et al. | |
| 5,791,918 A | 8/1998 | Pierce | |
| 5,862,290 A | 1/1999 | Burek et al. | |
| 5,867,621 A | 2/1999 | Luther et al. | |
| 5,960,141 A | 9/1999 | Sasaki et al. | |
| 5,961,344 A | 10/1999 | Rosales et al. | |
| 6,108,482 A | 8/2000 | Roth | |
| 6,112,006 A | 8/2000 | Foss | |
| 6,375,363 B1 | 4/2002 | Harrison et al. | |
| 6,386,891 B1 | 5/2002 | Howard et al. | |
| 6,466,725 B2 | 10/2002 | Battey et al. | |
| 6,536,956 B2 | 3/2003 | Luther et al. | |
| 6,554,489 B2 | 4/2003 | Kent et al. | |
| 6,629,782 B2 | 10/2003 | McPhee et al. | |
| 6,644,862 B1 | 11/2003 | Berto et al. | |
| 6,672,774 B2 | 1/2004 | Theuerkorn et al. | |
| 6,678,442 B2 | 1/2004 | Gall et al. | |
| 6,702,475 B1 | 3/2004 | Giobbio et al. | |
| 6,738,555 B1 | 5/2004 | Cooke et al. | |
| 6,771,861 B2 | 8/2004 | Wagner et al. | |
| 6,856,748 B1 | 2/2005 | Elkins et al. | |
| 6,916,120 B2 | 7/2005 | Zimmel et al. | |
| 6,962,445 B2 | 11/2005 | Zimmel et al. | |
| 7,033,191 B1 | 4/2006 | Cao | |
| 7,090,409 B2 | 8/2006 | Nakajima et al. | |
| 7,120,347 B2 | 10/2006 | Blackwell et al. | |
| 7,150,567 B1 | 12/2006 | Luther et al. | |
| 7,266,265 B2 | 9/2007 | Gall et al. | |
| 7,277,614 B2 * | 10/2007 | Cody | G02B 6/4472 385/100 |
| 7,302,152 B2 | 11/2007 | Luther et al. | |
| 7,330,629 B2 | 2/2008 | Cooke et al. | |
| 7,333,708 B2 | 2/2008 | Blackwell et al. | |
| 7,346,256 B2 | 3/2008 | Marrs et al. | |
| 7,366,416 B2 | 4/2008 | Ramachandran et al. | |
| 7,444,056 B2 | 10/2008 | Allen et al. | |
| 7,463,803 B2 | 12/2008 | Cody et al. | |
| 7,489,849 B2 | 2/2009 | Reagan et al. | |
| 7,512,304 B2 | 3/2009 | Gronvall et al. | |
| 7,542,645 B1 | 6/2009 | Hua et al. | |
| 7,565,055 B2 | 7/2009 | Lu et al. | |
| 7,614,797 B2 | 11/2009 | Lu et al. | |
| 7,621,675 B1 | 11/2009 | Bradley | |
| 7,627,222 B2 | 12/2009 | Reagan et al. | |
| 7,628,545 B2 | 12/2009 | Cody et al. | |
| 7,628,548 B2 | 12/2009 | Benjamin et al. | |
| 7,653,282 B2 | 1/2010 | Blackwell et al. | |
| 7,654,747 B2 | 2/2010 | Theuerkorn et al. | |
| 7,680,388 B2 | 3/2010 | Reagan et al. | |
| 7,708,476 B2 | 5/2010 | Liu | |
| 7,709,733 B1 | 5/2010 | Plankell | |
| 7,740,409 B2 | 6/2010 | Bolton et al. | |
| 7,742,670 B2 | 6/2010 | Benjamin et al. | |
| 7,753,596 B2 | 7/2010 | Cox | |
| 7,785,019 B2 | 8/2010 | Lewallen et al. | |
| 7,806,599 B2 | 10/2010 | Margolin et al. | |
| 7,844,160 B2 | 11/2010 | Reagan et al. | |
| RE42,094 E | 2/2011 | Barnes et al. | |
| 7,903,923 B2 | 3/2011 | Gronvall et al. | |
| 7,903,925 B2 | 3/2011 | Cooke et al. | |
| 7,933,517 B2 | 4/2011 | Ye et al. | |
| 8,025,445 B2 | 9/2011 | Rambow et al. | |
| 8,213,761 B2 | 7/2012 | Gronvall et al. | |
| 8,218,935 B2 | 7/2012 | Reagan et al. | |
| 8,267,596 B2 | 9/2012 | Theuerkorn | |
| RE43,762 E | 10/2012 | Smith et al. | |
| 8,301,003 B2 | 10/2012 | De et al. | |
| 8,301,004 B2 | 10/2012 | Cooke et al. | |
| 8,376,629 B2 | 2/2013 | Cline et al. | |
| 8,408,811 B2 | 4/2013 | De et al. | |
| 8,466,262 B2 | 6/2013 | Siadak et al. | |
| 8,472,773 B2 | 6/2013 | De Jong | |
| 8,506,173 B2 | 8/2013 | Lewallen et al. | |
| 8,520,996 B2 | 8/2013 | Cowen et al. | |
| 8,534,928 B2 | 9/2013 | Cooke et al. | |
| 8,556,522 B2 | 10/2013 | Cunningham | |
| 8,622,634 B2 | 1/2014 | Arnold et al. | |
| 8,662,760 B2 | 3/2014 | Cline et al. | |
| 8,678,668 B2 | 3/2014 | Cooke et al. | |
| 8,727,638 B2 | 5/2014 | Lee et al. | |
| 8,737,837 B2 | 5/2014 | Conner et al. | |
| 8,755,663 B2 | 6/2014 | Makrides-Saravanos et al. | |
| 8,758,046 B2 | 6/2014 | Pezzetti et al. | |
| 8,770,861 B2 | 7/2014 | Smith et al. | |
| 8,821,036 B2 | 9/2014 | Shigehara | |
| 8,882,364 B2 | 11/2014 | Busse et al. | |
| 8,917,966 B2 | 12/2014 | Thompson et al. | |
| 8,992,097 B2 | 3/2015 | Koreeda et al. | |
| 8,998,502 B2 | 4/2015 | Benjamin et al. | |
| 9,158,074 B2 | 10/2015 | Anderson et al. | |
| 9,158,075 B2 | 10/2015 | Benjamin et al. | |
| 9,207,410 B2 | 12/2015 | Lee et al. | |
| 9,297,974 B2 | 3/2016 | Valderrabano et al. | |
| 9,310,570 B2 | 4/2016 | Busse et al. | |
| 9,322,998 B2 | 4/2016 | Miller | |
| 9,405,068 B2 | 8/2016 | Graham et al. | |
| 9,435,969 B2 | 9/2016 | Lambourn et al. | |
| 9,442,257 B2 | 9/2016 | Lu | |
| 9,450,393 B2 | 9/2016 | Thompson et al. | |
| 9,482,819 B2 | 11/2016 | Li et al. | |
| 9,535,229 B2 | 1/2017 | Ott et al. | |
| 9,541,711 B2 | 1/2017 | Raven et al. | |
| 9,618,704 B2 | 4/2017 | Dean et al. | |
| 9,651,741 B2 | 5/2017 | Isenhour et al. | |
| 9,684,136 B2 | 6/2017 | Cline et al. | |
| 9,684,138 B2 | 6/2017 | Lu | |
| 9,696,500 B2 | 7/2017 | Barnette et al. | |
| 9,739,951 B2 | 8/2017 | Busse et al. | |
| 9,762,322 B1 | 9/2017 | Amundson | |
| 9,810,855 B2 | 11/2017 | Cox et al. | |
| 9,810,856 B2 | 11/2017 | Graham et al. | |

(56) References Cited

U.S. PATENT DOCUMENTS

| | | |
|---|---|---|
| 9,829,668 B2 | 11/2017 | Coenegracht et al. |
| 9,857,540 B2 | 1/2018 | Ahmed et al. |
| 9,864,151 B2 | 1/2018 | Lu |
| 9,910,236 B2 | 3/2018 | Cooke et al. |
| 9,921,375 B2 | 3/2018 | Compton et al. |
| 9,964,713 B2 | 5/2018 | Barnette et al. |
| 9,964,715 B2 | 5/2018 | Lu |
| 9,983,374 B2 | 5/2018 | Li et al. |
| 10,038,946 B2 | 7/2018 | Smolorz |
| 10,061,090 B2 | 8/2018 | Coenegracht |
| 10,073,224 B2 | 9/2018 | Tong et al. |
| 10,114,176 B2 | 10/2018 | Gimblet et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,359,577 B2 | 7/2019 | Dannoux et al. |
| 10,401,575 B2 | 9/2019 | Daily et al. |
| 10,409,007 B2 | 9/2019 | Kadar-Kallen et al. |
| 10,422,962 B2 | 9/2019 | Coenegracht |
| 10,451,830 B2 | 10/2019 | Szumacher et al. |
| 10,488,597 B2 | 11/2019 | Parikh et al. |
| 10,578,821 B2 | 3/2020 | Ott et al. |
| 10,606,006 B2 | 3/2020 | Hill et al. |
| 10,613,278 B2 | 4/2020 | Kempeneers et al. |
| 10,712,516 B2 | 7/2020 | Courchaine et al. |
| 10,739,534 B2 | 8/2020 | Murray et al. |
| 10,802,236 B2 | 10/2020 | Kowalczyk et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,781 B2 | 12/2020 | Hill et al. |
| 10,962,731 B2 | 3/2021 | Coenegracht |
| 11,061,191 B2 | 7/2021 | Van Baelen et al. |
| 11,290,188 B2 | 3/2022 | Tuccio et al. |
| 2001/0036342 A1 | 11/2001 | Knecht et al. |
| 2002/0064364 A1 | 5/2002 | Battey et al. |
| 2002/0131721 A1 | 9/2002 | Gaio et al. |
| 2003/0016440 A1 | 1/2003 | Zeidan et al. |
| 2003/0063866 A1 | 4/2003 | Melton et al. |
| 2003/0103733 A1 | 6/2003 | Fleenor et al. |
| 2004/0072454 A1 | 4/2004 | Nakajima et al. |
| 2004/0096162 A1 | 5/2004 | Kocher et al. |
| 2004/0157499 A1 | 8/2004 | Nania et al. |
| 2005/0019031 A1 | 1/2005 | Ye et al. |
| 2005/0036786 A1 | 2/2005 | Ramachandran et al. |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0093278 A1 | 5/2006 | Elkins et al. |
| 2006/0093303 A1 | 5/2006 | Reagan et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0232743 A1 | 9/2008 | Gronvall et al. |
| 2008/0264664 A1 | 10/2008 | Dinh et al. |
| 2008/0273837 A1 | 11/2008 | Margolin et al. |
| 2009/0041412 A1 | 2/2009 | Danley et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0156041 A1 | 6/2009 | Radle |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0040338 A1 | 2/2010 | Sek |
| 2010/0074578 A1 | 3/2010 | Imaizumi et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0266245 A1 | 10/2010 | Sabo |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0299814 A1 | 12/2011 | Nakagawa |
| 2012/0008909 A1 | 1/2012 | Mertesdorf et al. |
| 2012/0106912 A1 | 5/2012 | Mcgranahan et al. |
| 2012/0183268 A1 | 7/2012 | De et al. |
| 2012/0251063 A1 | 10/2012 | Reagan et al. |
| 2012/0252244 A1 | 10/2012 | Elkins et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe et al. |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0161397 A1 | 6/2014 | Gallegos et al. |
| 2014/0205257 A1 | 7/2014 | Durrant et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0241689 A1 | 8/2014 | Bradley et al. |
| 2014/0294395 A1 | 10/2014 | Waldron et al. |
| 2014/0328559 A1 | 11/2014 | Kobayashi et al. |
| 2014/0348467 A1 | 11/2014 | Cote et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0185423 A1 | 7/2015 | Matsui et al. |
| 2015/0253528 A1 | 9/2015 | Corbille et al. |
| 2015/0268434 A1 | 9/2015 | Barnette et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0161688 A1 | 6/2016 | Nishimura |
| 2016/0161689 A1 | 6/2016 | Nishimura |
| 2016/0209599 A1 | 7/2016 | Van et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0306122 A1 | 10/2016 | Tong et al. |
| 2017/0131509 A1 | 5/2017 | Xiao et al. |
| 2017/0168248 A1 | 6/2017 | Hayauchi et al. |
| 2017/0170596 A1 | 6/2017 | Goossens et al. |
| 2017/0176690 A1 | 6/2017 | Bretz et al. |
| 2017/0219782 A1 | 8/2017 | Nishimura |

(56) References Cited

U.S. PATENT DOCUMENTS

| | | |
|---|---|---|
| 2017/0238822 A1 | 8/2017 | Young et al. |
| 2017/0254962 A1 | 9/2017 | Mueller-Schlomka et al. |
| 2017/0261699 A1 | 9/2017 | Compton et al. |
| 2018/0081127 A1 | 3/2018 | Coenegracht |
| 2018/0267265 A1 | 9/2018 | Zhang et al. |
| 2019/0004252 A1 | 1/2019 | Rosson |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057224 A1 | 2/2020 | Dannoux et al. |
| 2020/0057723 A1 | 2/2020 | Chirca et al. |
| 2020/0103608 A1 | 4/2020 | Johnson et al. |
| 2020/0110229 A1 | 4/2020 | Dannoux et al. |
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0348476 A1 | 11/2020 | Hill et al. |

FOREIGN PATENT DOCUMENTS

| | | |
|---|---|---|
| CN | 1213783 A | 4/1999 |
| CN | 1114839 C | 7/2003 |
| CN | 1646962 A | 7/2005 |
| CN | 1833188 A | 9/2006 |
| CN | 101084461 A | 12/2007 |
| CN | 101111790 A | 1/2008 |
| CN | 101195453 A | 6/2008 |
| CN | 101846773 A | 9/2010 |
| CN | 101939680 A | 1/2011 |
| CN | 201704194 U | 1/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 106716205 A | 5/2017 |
| CN | 106873086 A | 6/2017 |
| EP | 0244791 A2 | 11/1987 |
| EP | 0957381 A1 | 11/1999 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63-078908 A | 4/1988 |
| JP | 63-089421 A | 4/1988 |
| JP | 03-063615 A | 3/1991 |
| JP | 03-207223 A | 9/1991 |
| JP | 07-318758 A | 12/1995 |
| JP | 08-292331 A | 11/1996 |
| JP | 09-049942 A | 2/1997 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-326693 A | 11/1999 |
| JP | 2001-290051 A | 10/2001 |
| JP | 2003-121699 A | 4/2003 |
| JP | 2003-177279 A | 6/2003 |
| JP | 2005-031544 A | 2/2005 |
| JP | 2005-077591 A | 3/2005 |
| JP | 2006-023502 A | 1/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-033698 A | 2/2011 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207233 U | 11/2016 |
| KR | 10-2013-0081087 A | 7/2013 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |

(56) References Cited

FOREIGN PATENT DOCUMENTS

| | | |
|---|---|---|
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Coaxum, L., et al., U.S. Appl. No. 62/341,947, Tiber Optic Multiport Having Different Types of Ports for Multi-Use, filed May 26, 2016.

Faulkner et al. "Optical networks for local lopp applications," J. Lightwave Technol.0733-8724 7(11), 17411751 (1989).

Infolite—Design and Data Specifications, 1 pg. Retrieved Feb. 21, 2019.

International Search Report and Written Opinion of the International Searching Authority; PCT/US19/67781; Mailed Apr. 2, 2020; 12 Pages; European Patent Office.

Nawata, "Multimode and Single-Mode Fiber Connectors Technology"; IEEE Journal of Quantum Electronics, vol. QE-16, No. 6 Published Jun. 1980.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Wang et al. "Opto-VLSI-based dynamic optical splitter," Electron. Lett.0013-5194 10.1049/el:20046715 40(22), 14451446 (2004).

Xiao et al. "1xN wavelength selective adaptive optical power splitter for wavelength-division-multiplexed passive optical networks," Optics & Laser Technology 68, pp. 160-164, May 2015.

* cited by examiner

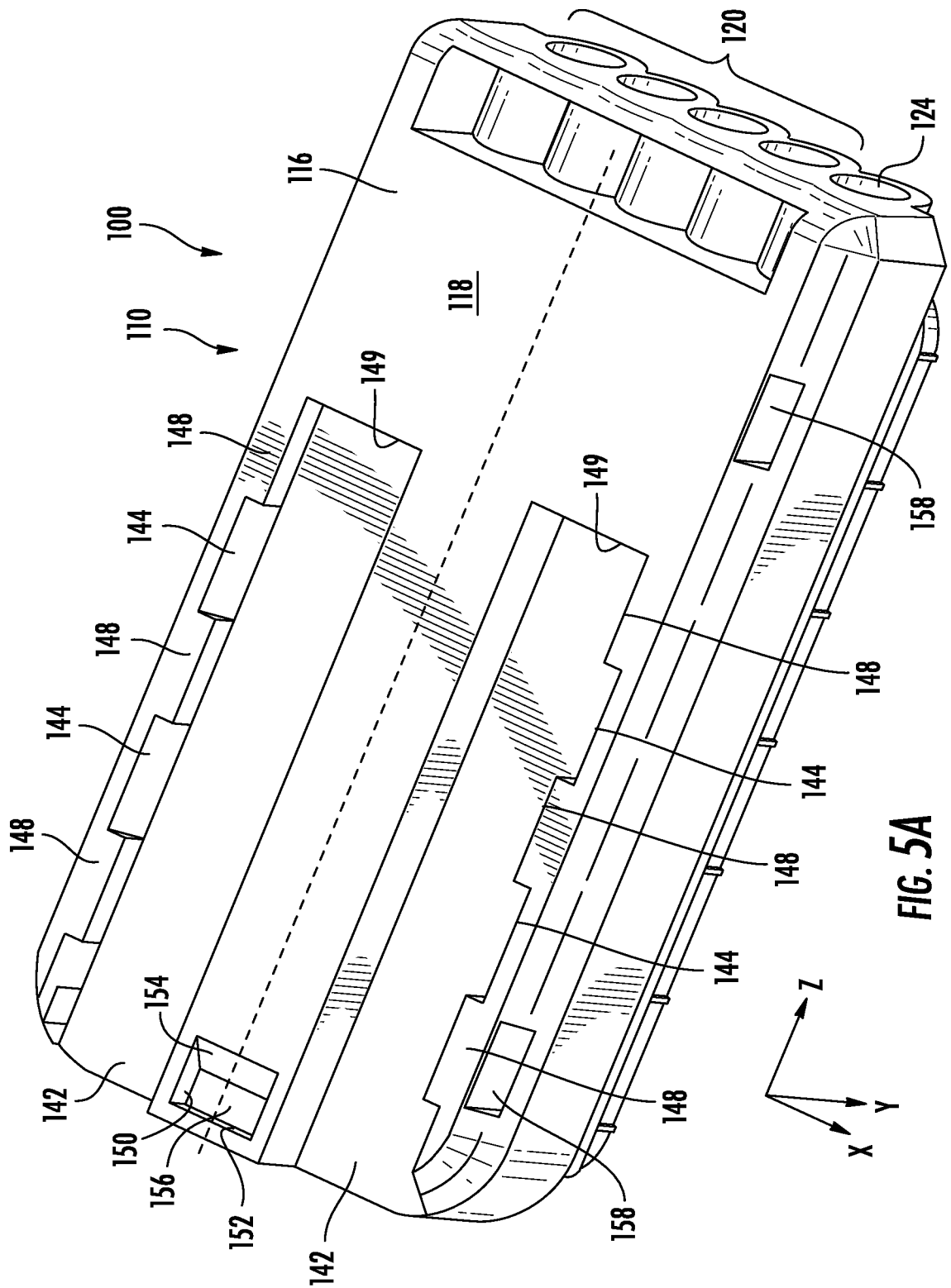

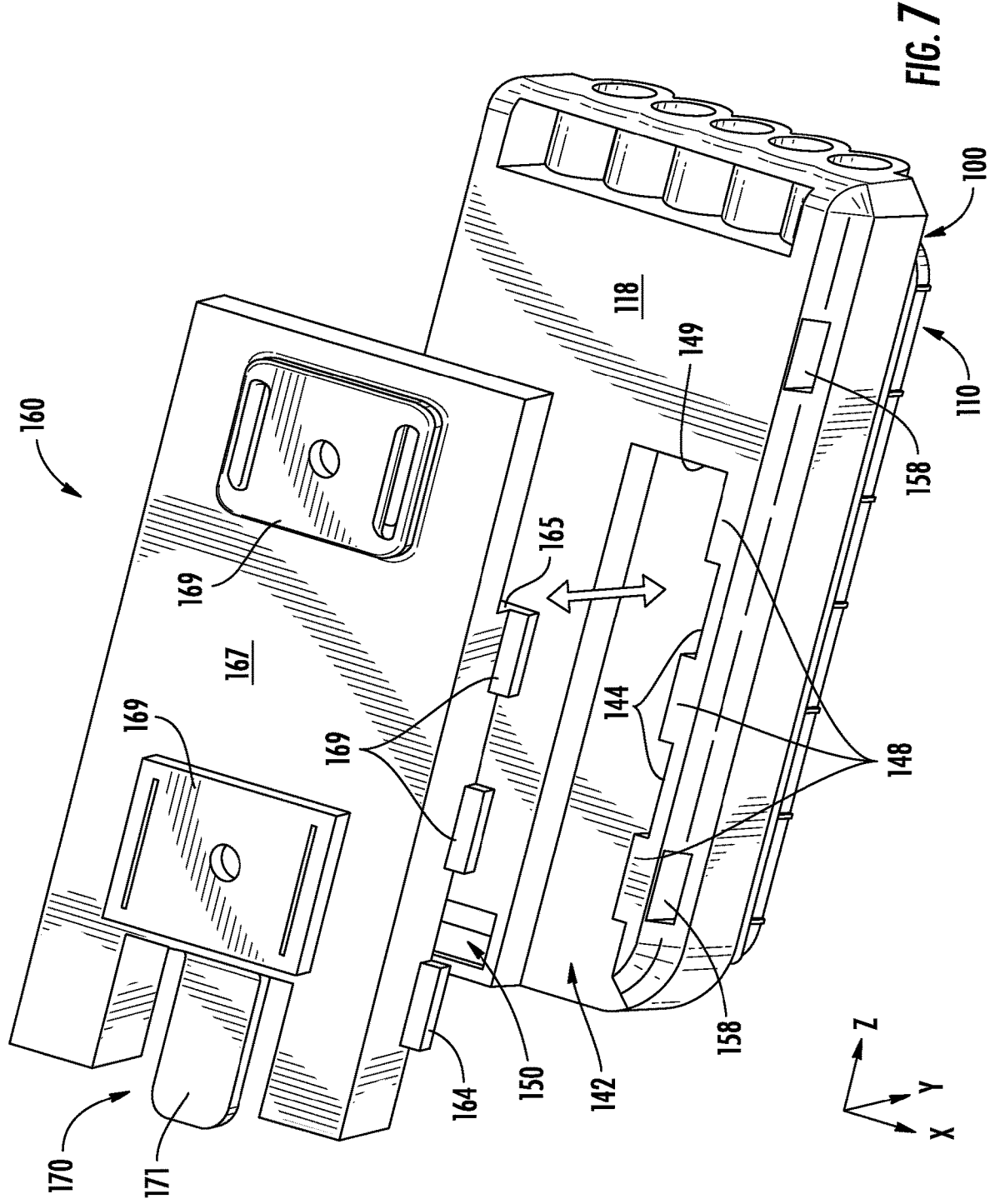

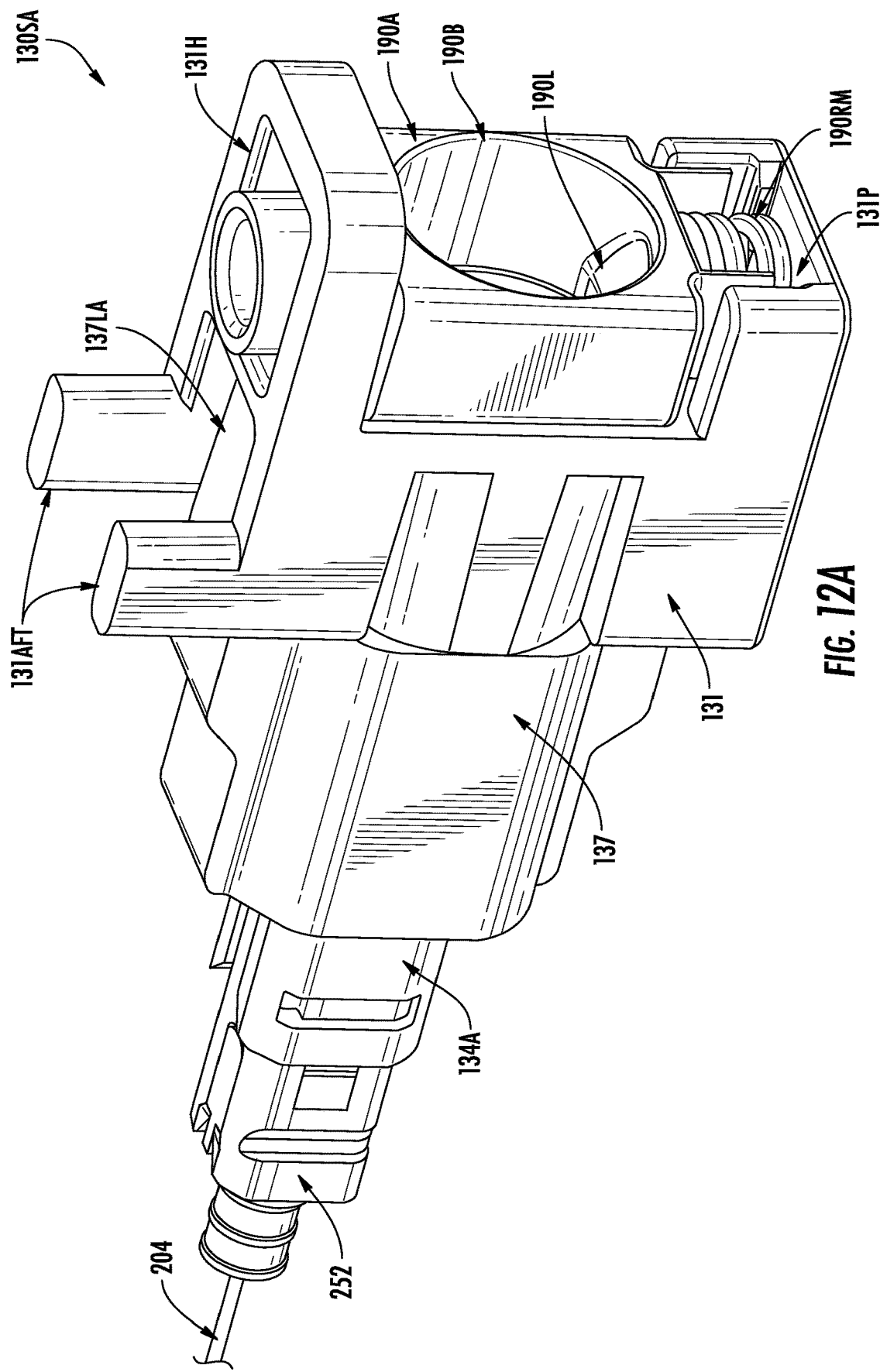

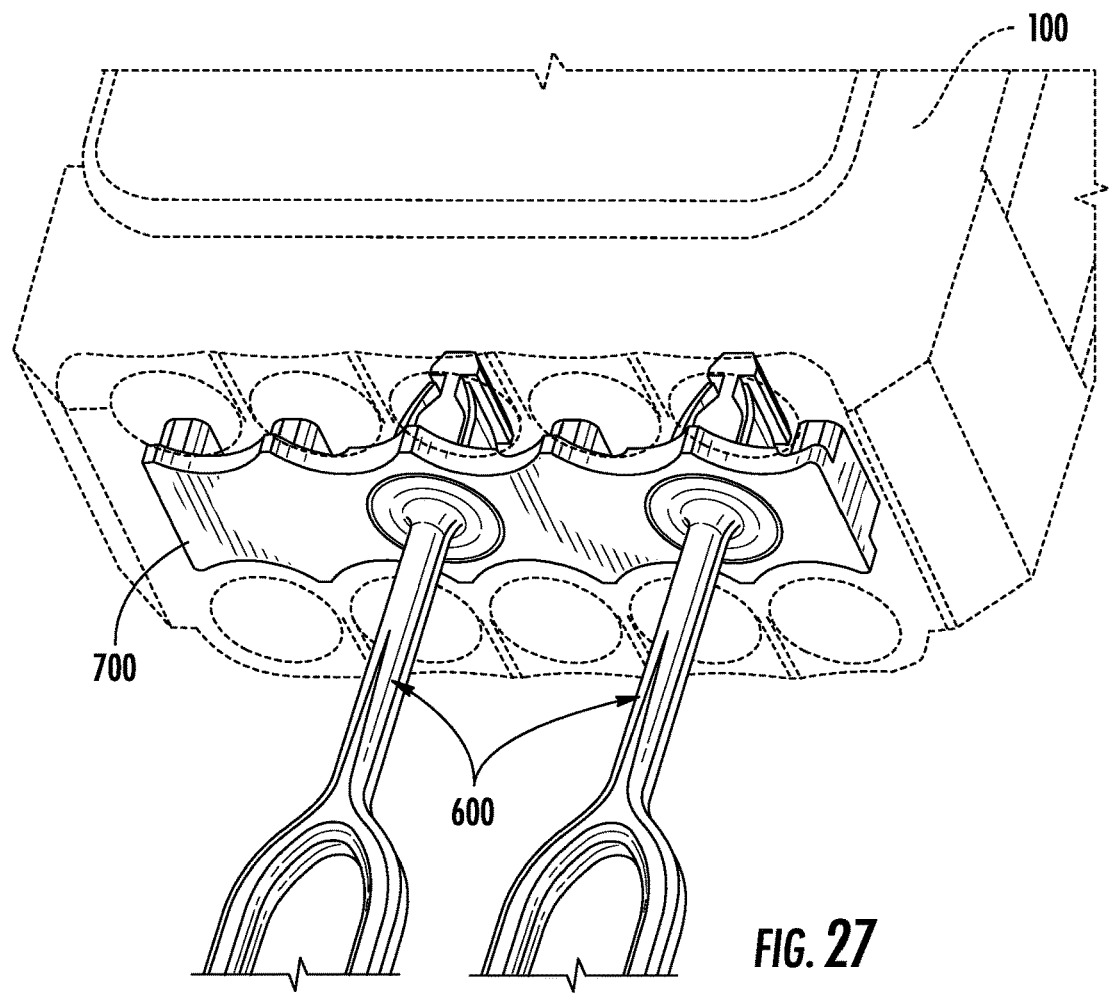
FIG. 27
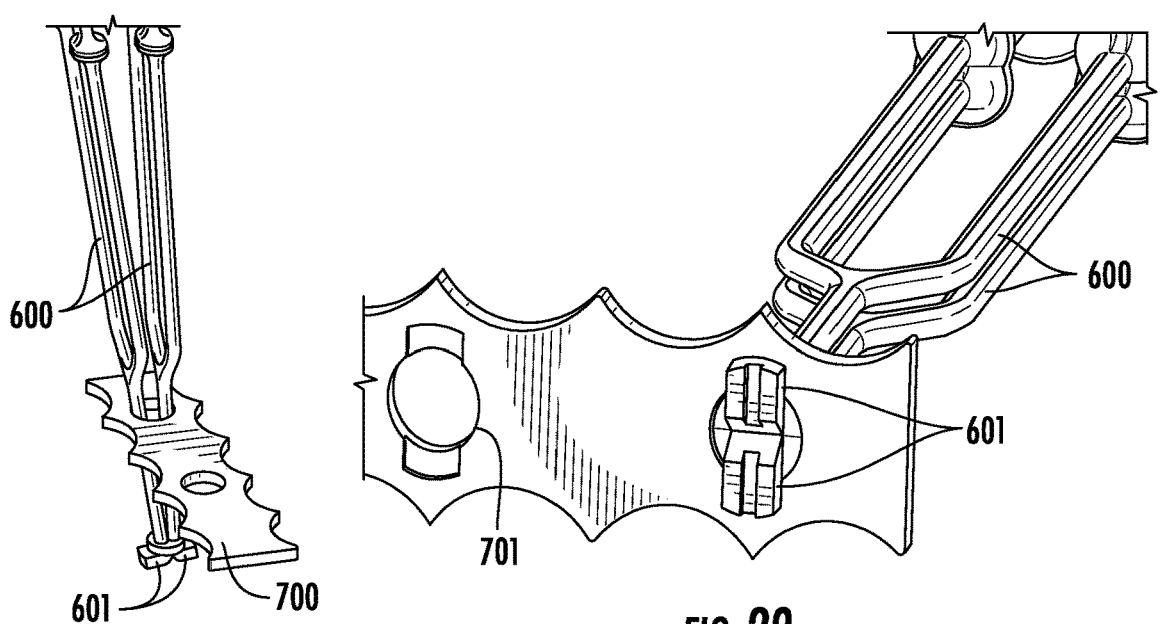
FIG. 28
FIG. 29

MULTIPORT ASSEMBLIES INCLUDING MOUNTING FEATURES OR DUST PLUGS

CROSS-REFERENCES TO RELATED APPLICATIONS

This application is a continuation of International Application No. PCT/US2019/067781 filed Dec. 20, 2019, which claims the benefit of priority to U.S. Application No. 62/785,871, filed Dec. 28, 2018, both applications being incorporated herein by reference.

BACKGROUND

Field

The present disclosure relates generally to multiport assemblies having one or more connector ports for interconnecting optical fibers using external fiber optic connectors that are received in respective connector ports. More particularly the present disclosure is directed to multiport assemblies having mounting features for securing the assemblies to a pole, building, or other suitable structure and/or dust plugs for inhibiting dirt, dust or debris from entering the connector port when not in use.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles or optical port in the network using fiber optic connectors. These optical fibers and fiber optic cables terminated with optical fiber connectors are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles, optical ports or the like with which the aforementioned terminated fibers and cables are coupled are commonly provided at optical network units (ONUs), network interface devices (NIDs), multiports, closures, terminals and other types of network devices or enclosures, and often require mounting hardware that is sufficiently robust to be employed in a variety of environments under a variety of installation conditions. These diverse environments or conditions for mounting the devices may be subject to the outside plant environment, rough handling, and/or the habits of the technicians handling and installing the hardware. Consequently, there is a continuing need to enhance the robustness of these connectorized assemblies, while preserving quick, reliable, and trouble-free installation of devices into the network.

BRIEF SUMMARY

According to the subject matter of the present disclosure, multiport assemblies and methods for connecting optical connecters in a multiport assembly are provided. Specifically, multiport assemblies having one or more mounting features and/or dust plugs are disclosed. One aspect of the disclosure is directed to a multiport assembly comprising a shell, a plurality of optical adapter assemblies, and a mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, and a lower surface. The plurality of optical adapter assemblies are positioned within the cavity of the shell and are structurally configured to optically couple optical connectors. The mounting member is coupled to the shell and defines an aperture extending through the mounting member, and at least one standoff that extends outward from a lower surface of the shell.

Another aspect of the disclosure is directed to a multiport assembly comprising a shell, a plurality of optical adapter assemblies, a mounting member, and a second mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, a lower surface, and a rear shell aperture. The plurality of optical adapter assemblies are positioned within the cavity of the shell and are structurally configured to optically couple optical connectors. The mounting member is coupled to the shell and comprises an aperture extending through the mounting member, and at least one standoff that extends outward from a lower surface of the shell. The second mounting member comprises an aperture and a standoff portion, and the shell defines a rear shell aperture that receives a portion of the second mounting member.

Yet another aspect of the disclosure is directed to a multiport assembly comprising a shell, a plurality of optical adapter assemblies, and a dust plug. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell. The plurality of optical adapter assemblies are positioned within the cavity of the shell and are associated with the plurality of optical connector ports along with being structurally configured to optically couple optical connectors. The dust plug comprises a locking feature and a keying portion.

Still another aspect of the disclosure is directed to a multiport assembly comprising a shell, a plurality of optical adapter assemblies, and a mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, and a lower surface. The plurality of optical adapter assemblies are positioned within the cavity of the shell and structurally configured to optically couple optical connectors. The mounting member is coupled to the shell and comprises an aperture extending through the mounting member, and at least one standoff that extends outward from a lower surface of the shell.

A further aspect of the disclosure is directed to a method for securing a multiport assembly to a surface. The method comprising positioning a fastener through an aperture of a mounting member and installing the mounting member to the surface, where in the mounting member comprises a standoff engaged with the surface and an outward face that is spaced apart from the standoff on the surface. Aligning a slot engagement tab of the mounting member with a cutout defined by a slot of a shell of the multiport assembly. Sliding the multiport assembly with respect to the mounting member to position the slot engagement tab within a channel bounded by a bottom face, a sidewall, and a tab of the slot of the shell, and engaging a latch of the mounting member with a latch recess defined by the shell of the multiport assembly.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 5A schematically a lower perspective view of the shell multiport assembly of FIG. 1, according to one or more embodiments shown and described herein;

FIG. 7 schematically depicts an exploded view of the mounting member and the shell of the multiport assembly of FIG. 1, according to one or more embodiments shown and described herein;

FIG. 12A schematically depicts an assembled view of an explanatory modular optical adapter assembly for use with the multiport assembly of FIG. 11 with the internal connector inserted into the rear portion of the sub-assembly;

FIG. 27 depicts the faceplate and dust plug sub-assembly of FIGS. 25 and 26 attached to a multiport assembly;

FIGS. 28 and 29 depict the another dust plug having a tether where the tethers are attached to a faceplate in a duplex configuration;

DETAILED DESCRIPTION

Embodiments described herein generally relate to various devices for forming an optical connection between optical fibers. More particularly, embodiments described herein relate to multiport assemblies including a plurality of optical adapter assemblies structurally configured to optically couple optical connectors. Optical connectors may be selectively inserted within the multiport assembly to engage the plurality of optical adapter assemblies, and may be selectively retained within the multiport assembly by push-button securing members. The push-button securing members may also selectively release the optical connectors such that the optical connectors may be disengaged from the optical adapters.

Embodiments described herein securing members for securing a multiport assembly to a surface, such as a wall, a utility pole, or the like. Multiport assemblies may be secured to a surface of an object, and in some instances, the surface may not necessarily correspond to the exact shape and contour of the multiport assembly. As the multiport assembly is secured to a surface including a different surface contour than the shell of the multiport assembly, the shell may deform. For example, when a fastener or the like is used to secure the multiport assembly to the surface, the fastener may apply a force to the multiport assembly in a direction that is transverse to the surface, pulling the multiport assembly toward the surface. The force applied to the multiport assembly may in some instances, be sufficient to deform the shell of the multiport assembly, thereby degrading the structural integrity of the multiport assembly, which may lead a variety of issues, including allowing moisture or other environmental effects to reach a cavity of the multiport assembly.

Embodiments described herein are directed to multiport assemblies including mounting members with standoff features that limit the surface area of the multiport assembly in contact with surface to which the multiport assembly is secured. The standoffs act to space the shell of the multiport assembly apart from the surface, which assists in limiting deformation of the shell as the shell is secured to the surface, thereby assisting in maintaining the structural integrity of the multiport assembly. These and other embodiments will now be described with specific reference to the appended drawings.

As used herein, the term "longitudinal direction" refers to the forward-rearward direction of components of the multiport assembly (i.e., in the +/−Z-direction as depicted). The term "lateral direction" refers to the cross-direction of components of the multiport assembly (i.e., in the +/−X-direction as depicted), and is transverse to the longitudinal direction. The term "vertical direction" refers to the upward-downward direction of the components of the multiport assembly (i.e., in the +/−Y-direction as depicted), and is transverse to the lateral and the longitudinal directions.

Figure 1:
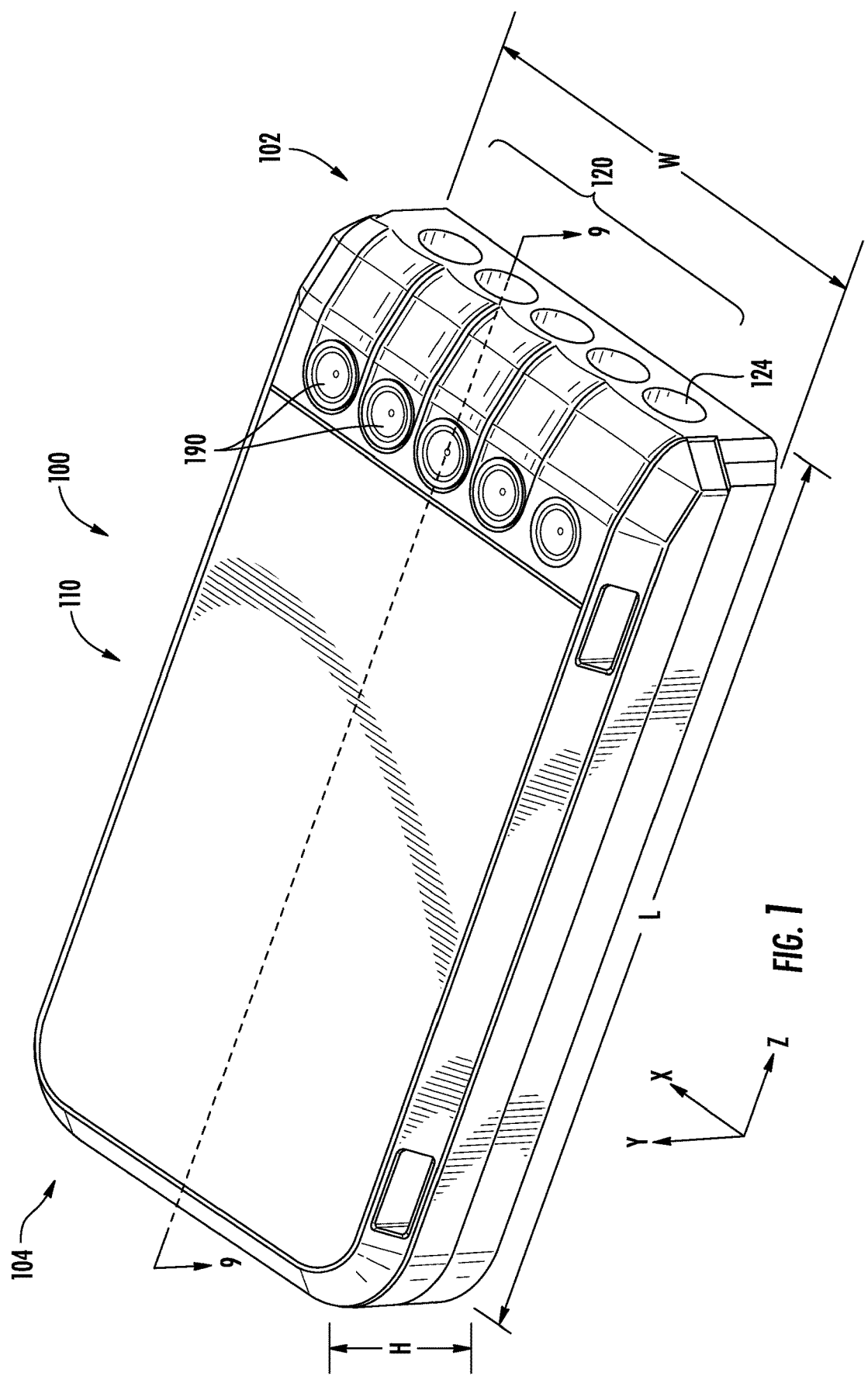
FIG. 1 schematically depicts a perspective view of a multiport assembly, according to one or more embodiments shown and described herein.

Referring initially to FIG. 1, a perspective view of a multiport assembly 100 is schematically depicted. The multiport assembly 100 generally includes a shell 110 that extends between a front end 102 and a rear end 104 in the longitudinal direction and defines a plurality of optical connector ports 120 positioned at the front end 102 of the multiport assembly 100. A plurality of optical connectors may be inserted within the plurality of optical connector ports 120 as described in greater detail herein. In some embodiments, the shell 110 defines an input connector port 124 positioned at the front end 102 of the multiport assembly 100. An input connector, such as an input tether may be inserted within the input connector port 124, as described in greater detail herein.

Figure 2:
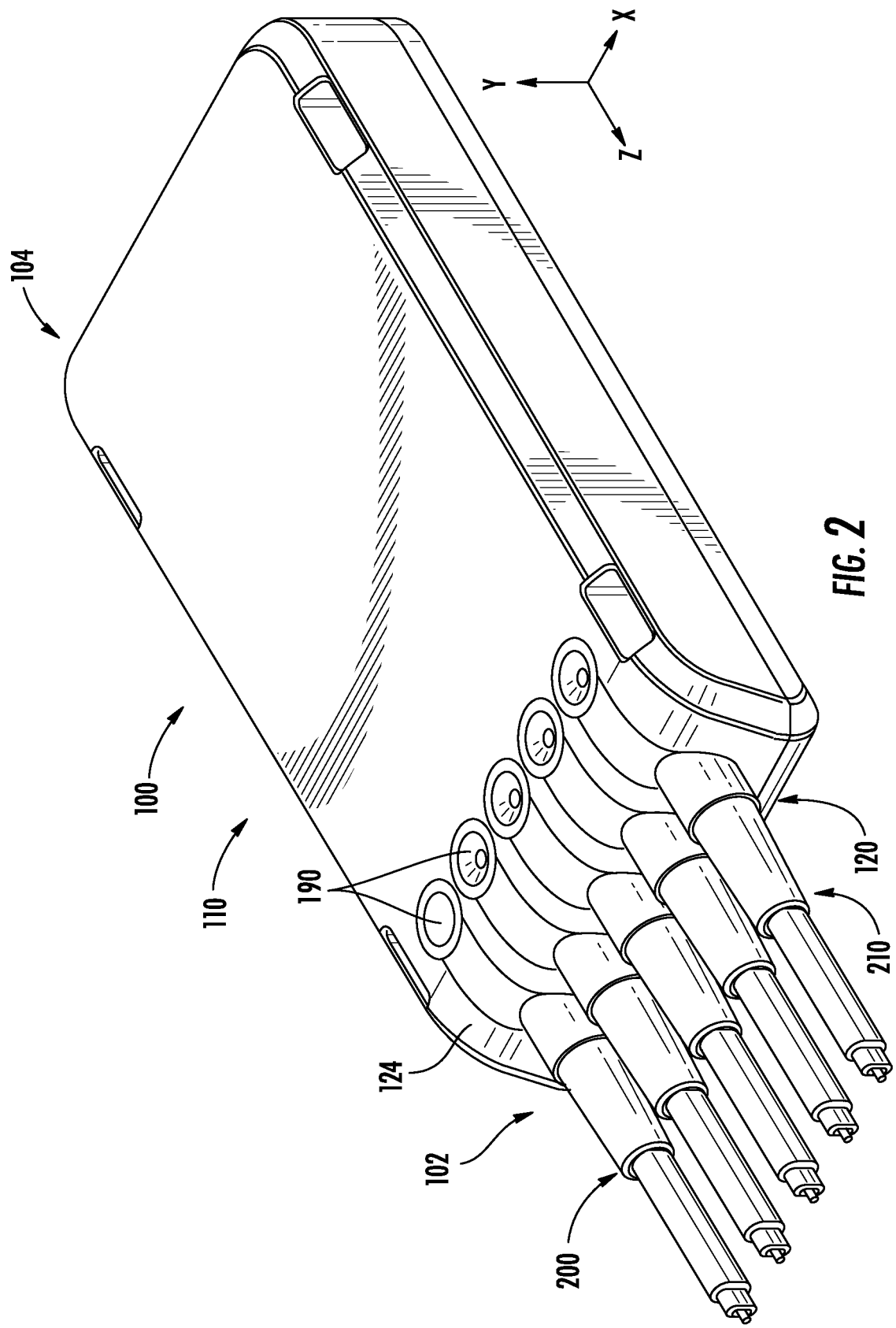
FIG. 2 schematically depicts a lower perspective view of the multiport assembly of FIG. 1 with a plurality of optical connectors and an input tether inserted within a plurality of optical connector ports of the multiport assembly, according to one or more embodiments shown and described herein.

Referring to FIG. 2, a perspective view of the multiport assembly 100 is depicted with a plurality of optical connectors 210 inserted within corresponding optical connector ports 120 of the multiport assembly 100. In the embodiment depicted in FIG. 2, an input tether 200 is inserted within the input connector port 124. While in the embodiment depicted in FIG. 2, the input connector port 124 is positioned at the front end 102 of the multiport assembly 100, it should be understood that the input connector port 124 may be positioned at any suitable location on the multiport assembly 100.

Figure 12:
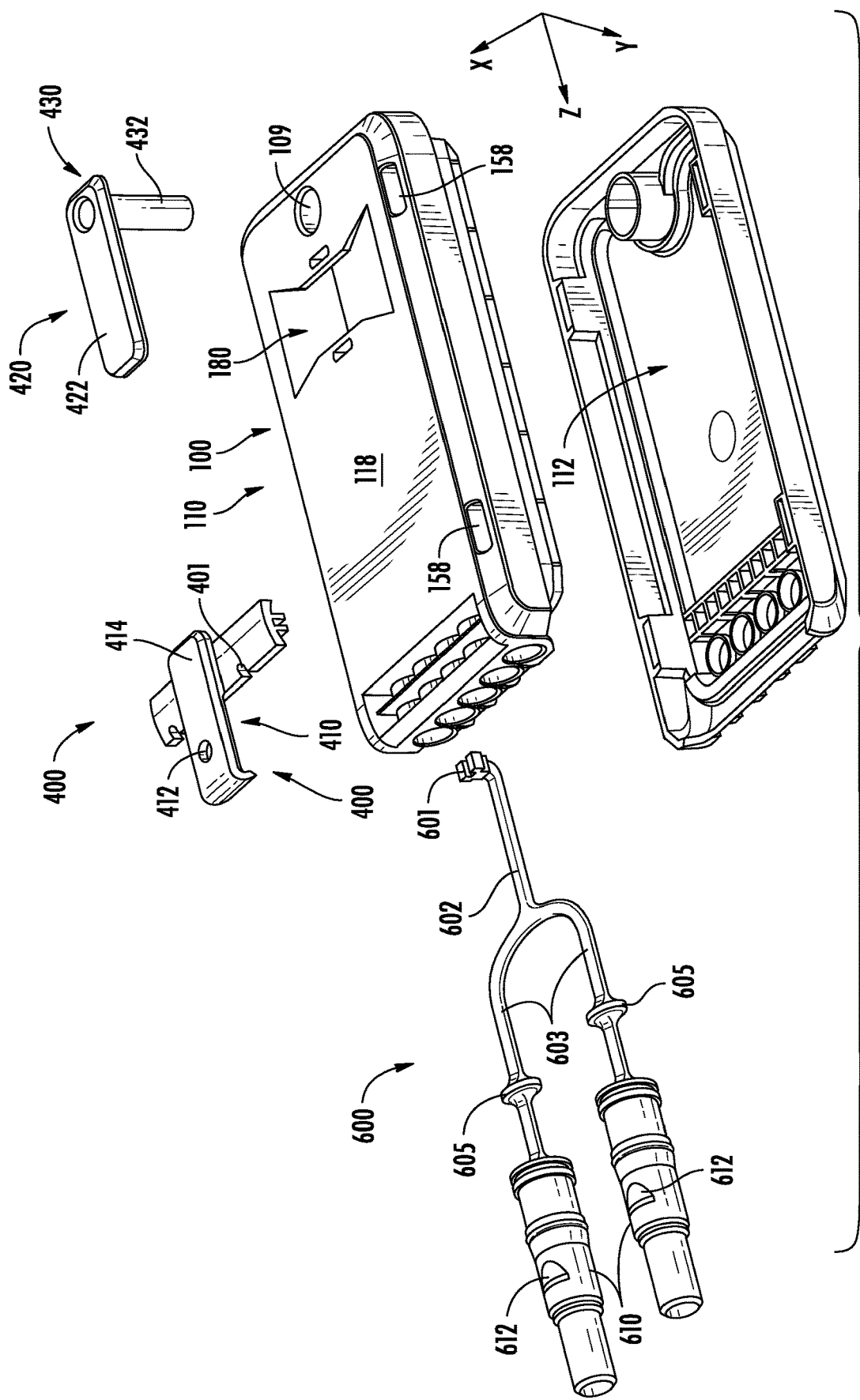
FIG. 12 schematically depicts an exploded view of the mounting member and an explanatory dust plug with a tether for use with the multiport assembly of FIG. 11 with the internal components of the multiport assembly not shown for clarity, according to one or more embodiments shown and described herein.
Figure 12B:
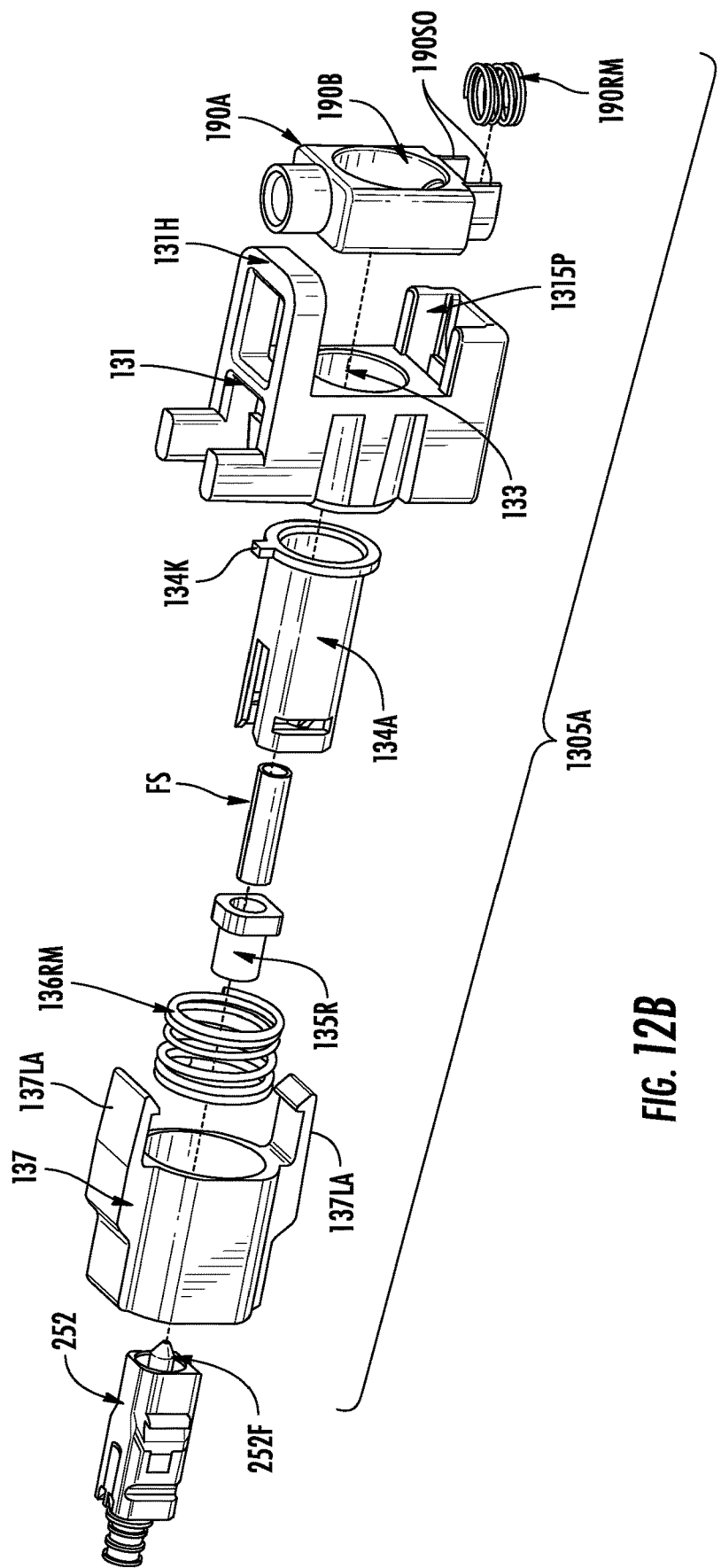
FIG. 12B schematically depicts an exploded view of the modular optical adapter assembly of FIG. 12A.

Multiport assembly 100 comprises at least one securing member 190A such as depicted in FIGS. 12A and 12B associated with the connector ports 120, 124; however other structures may be used for securing the optical connectors 210 to the multiport assembly 100. The respective securing member 190A cooperate with the housing of the respective optical connectors 210 for securing the optical connectors 210 in the port when fully-seated. For instance, a locking feature 190L on the respective securing member 190A may cooperate with a cooperating locking feature integrally-formed in the housing of the optical connector 210. When a respective push-button securing members 190 associated with each of the optical connector ports 120 and the input connector port 124 is pushed downward, then the respective optical connector 210 may be released from the respective connector port 120, 124. As discussed in further detail below, the securing elements 190A are generally aligned with a respective adapter that may receive an internal connector (i.e., rear connector) for aligning and making an optical connection with the external optical connector 210.

The securing elements 190A disclosed herein may take any suitable construction or configuration as desired such as being formed as a single component of a plurality of components. For instance, the push-button securing member 190 may be integrally-formed with the securing element 190A a monolithic structure if desired. Securing element 190A may be biased by a resilient member 190RM to a normally closed or secured position. Upon insertion of the optical connector 210 into connector port 120, 124, the connector translates the respective securing element 190A against the resilient member 190RM until the optical connector 210 is fully-inserted into the connector port and allows the securing element 190A to translate from the force applied by the resilient member 190RM to the closed or secured position for retaining the optical connector 210 in the respective connector port 120, 124.

Furthermore, the securing element 190A or portions of the securing elements may be constructed as a portion of a modular optical adapter assembly 130SA as depicted in FIGS. 12A and 12B for easy assembly. The use of modular optical adapter assemblies 130SA allows for the mating components for each connector port 120, 124 to move or "float" independently of other mating components relative to the shell 110 relative to other connector ports for preserving optical performance. "Float" means that the adapter can have slight movement in the X-Y plane for alignment, and may be inhibited from over-traveling in the Z-direction along the axis of optical connector insertion so that suitable alignment is made between mating connectors, which may include a biasing spring 136RM for allowing some displacement of the adapter with a suitable restoring force provided by the spring. Of course, other constructions are possible for use with the multiport assemblies having mounting features and/or dust plugs disclosed herein, such as having common parts for mounting a plurality of adapters and/or integrally-molding portions in the lower shell such as saddles, mounts or other structures for adapters.

Figure 3:
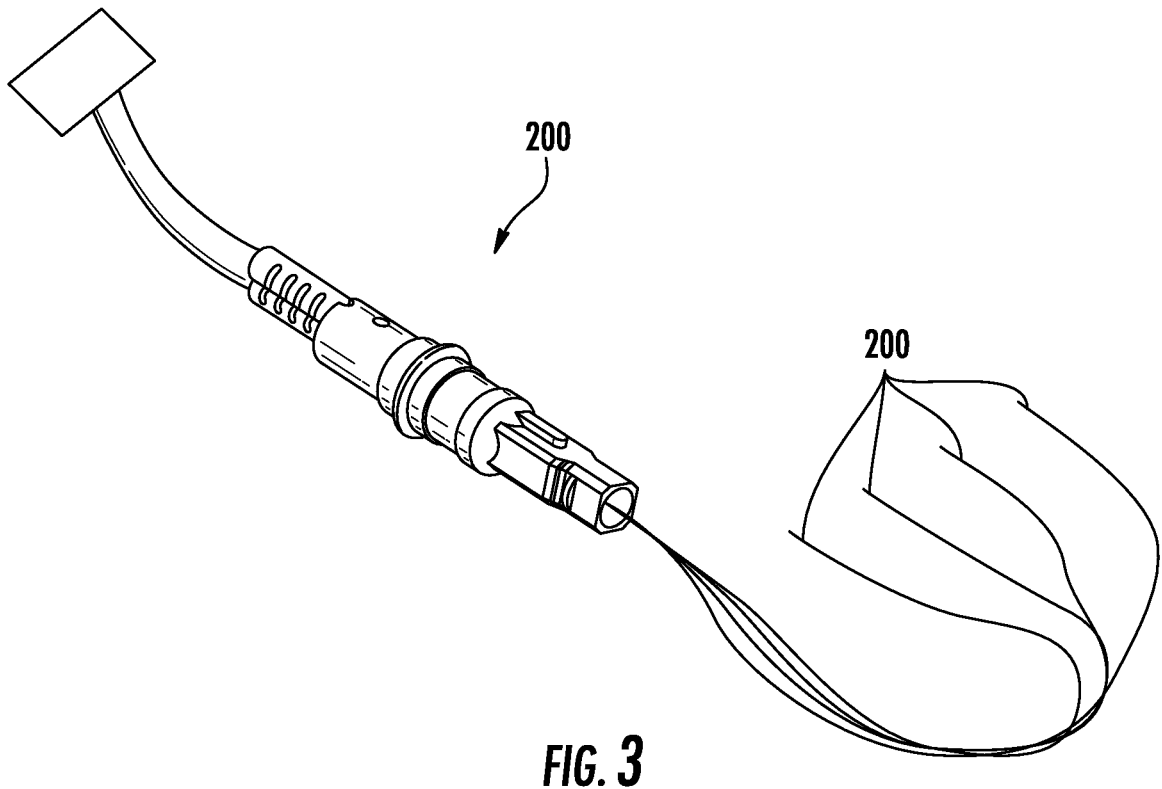
FIG. 3 schematically depicts the input tether of FIG. 2 in isolation, according to one or more embodiments shown and described herein.

Referring to FIG. 3, the input tether 200 is depicted in isolation. The input tether 200 may generally include a plurality of optical fibers 202 therein, which may be terminated within the multiport assembly 100, for example at corresponding optical adapter assemblies, as described in greater detail herein. In some embodiments, the input tether 200 may include a furcation body that generally includes a portion of the input tether 200 that transitions to the individual fibers 202 for routing within a cavity of the shell 110 to facilitate connection to corresponding optical adapter assemblies. In some embodiments, input tether 200 may terminate with a fiber optic connector or be a stubbed cable as desired. For instance, the input tether 200 could be an OptiTip® connector for optical connection to previously installed distribution cables; however, other suitable single-fiber or multi-fiber connectors such as an OptiTap® may be used for terminating the input tether 200 as desired. While the embodiment depicted in FIG. 3 depicts an input tether 200 including a plurality of optical fibers 202, it should be understood that in other embodiments, the input tether 200 may include a single optical fiber, as described in greater detail herein.

Figure 4:
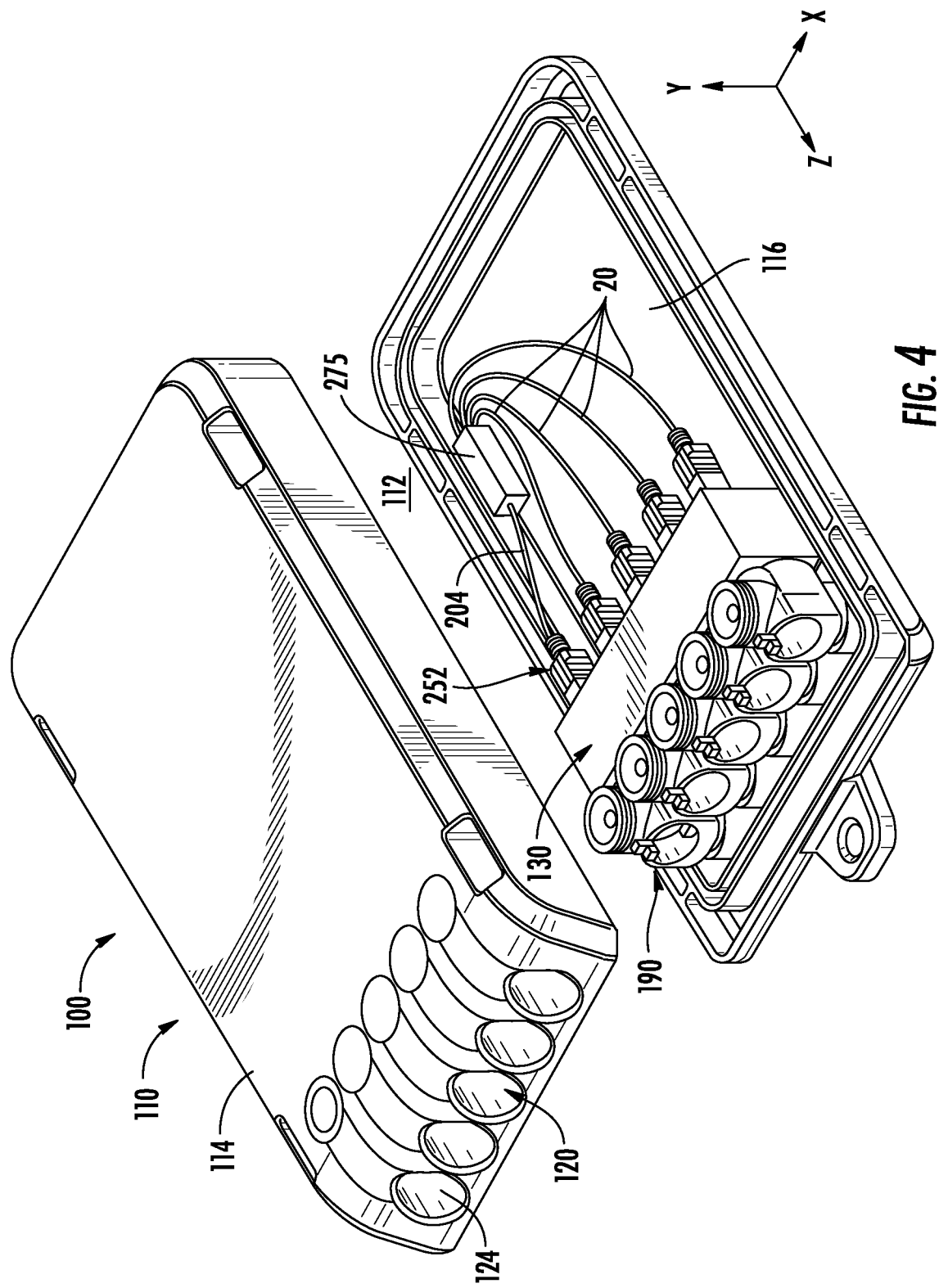
FIG. 4 schematically depicts an exploded view of the multiport assembly of FIG. 1, according to one or more embodiments shown and described herein.

Referring to FIG. 4, an exploded perspective view of the multiport assembly 100 is depicted. The shell 110 generally includes an upper shell member 114 coupled to a lower shell member 116, the upper shell member 114 and the lower shell member 116 defining a cavity 112 positioned within the shell 110. In embodiments, the upper shell member 114 and the lower shell member 116 may be formed from any suitable material, such as a polymer, a composite, a resin, or the like, and may be formed through any suitable process, such as and without limitation molding or the like. The shell 110 of the multiport assembly 100 may optionally be weatherproofed by appropriately sealing the upper shell member 114 to the lower shell member 116. The optical connector ports 120 and the input connector port 124 may also be sealed with the plurality of optical connectors 210 and the input tether 200, respectively, using any suitable means such as gaskets, O-rings, adhesive, sealant, welding, overmolding or the like. If the multiport assembly 100 is intended for indoor applications, then the weatherproofing may not be required.

In one embodiment, to seal the upper shell member 114 and the lower shell member 116 together, a heat soluble resin may be utilized. The heat soluble resin can be in the form of a thermoplastic cord containing magnetically active particles. For example, the heat soluble resin can be placed in a groove defined by the upper shell member 114 and/or the lower shell member 116, and the upper shell member 114 and the lower shell member 116 may be pressed toward each other. An induced energy may then be applied to heat the heat soluble material (also referred to herein as a resin) causing the heat soluble material to soften and then re-harden after cooling, thereby making a strong seal at the housing interface. Typically, the strength seal (e.g., the cord of thermoplastic) extends entirely around a perimeter of the upper shell member 114 and the lower shell member 116; however, in some applications the cord does not extend entirely around the perimeter. The resin can include magnetically active particles and the induced energy can be a radio frequency (RF) electromagnetic field which induces eddy currents in the magnetically active pieces. The eddy currents flowing in the magnetically active particles heat the magnetically active particles which cause the heat soluble material to soften and bond with the upper shell member 114 and the lower shell member 116. The RF field is then turned off, and when the heat soluble material cools off, the heat soluble material hardens, and thus, the upper shell member 114 and the lower shell member 116 are welded together. One exemplary process employs EMABOND™, commercially available from the Ashland Specialty Chemical company of Ohio as the heat soluble material with embedded magnetically active particles.

In some embodiments, the multiport assembly 100 includes respective push-button securing members 190 associated with each of the optical connector ports 120 and the input connector port 124; however, the securing members 190 may have other constructions such as sliders or rotating buttons that may be actuated for releasing the optical connector 210 from the respective connector ports 120, 124 if desired. The plurality of push-button securing members 190 are structurally configured to engage with respective securing elements 190A so that the input tether 200 and/or the plurality of optical connectors 210 and retain at least a portion of the input tether 200 and/or the plurality of optical connectors 210 for optical connection with optical fibers within the cavity 112 of the multiport assembly 100. In embodiments, the plurality of push-button securing members 190 selectively retain the plurality of optical connectors 210 and/or the input tether 200 within the respective connector ports 120, 124 of the multiport assembly 100. In the embodiment depicted in FIG. 4, the input tether 200 and the plurality of optical connectors 210 are each selectively retained within the respective connector ports 120, 124 of the multiport assembly 100 using the respective securing elements 190A and may be released using the plurality of push-button securing members 190 if desired. In other embodiments, the plurality of optical connectors 210 may be selectively retained within the respective connector ports 120, 124 of the multiport assembly 100, while the input tether 200 is rigidly connected to the multiport assembly 100 (i.e., the input tether 200 is not generally removable from the multiport assembly 100 without dis-assembling the multiport assembly 100). The input tether 200 and/or the optical connectors 210 may be secured to the multiport assembly 100 in other suitable manners such as, a bayonet connection, adhesive, a collar or crimp, heat shrink or combinations of the same.

The multiport assembly 100 further includes a plurality of optical adapter assemblies 130 positioned within the cavity 112 of the shell 110. The plurality of optical adapter assemblies 130 are structurally configured to receive, align, and optically couple optical connectors. In embodiments each of the plurality of optical adapter assemblies 130 are aligned with a corresponding optical connector port of the plurality of optical connector ports 120 and/or with the input connector port 124. The optical adapter assemblies 130 may receive an optical connector 252 at the rear portion for optical connection with an external optical connector 210 such as shown in FIG. 4. Any suitable optical adapter assembly is possible with the concepts disclosed herein such as using a common retainer or common clamshell for securing a plurality of optical adapters. Other variations are possible as well, and FIGS. 12A and 12B depict an explanatory optical adapter sub-assembly 130SA.

In some embodiments, one or more optical splitters 275 may be positioned within the cavity 112 defined by the shell 110, and may split a signal from a single optical fiber 204 into a plurality of optical fibers 202. In particular, the optical splitter 275 may receive a single optical fiber 204, for example from an input tether 200 (FIG. 3), and may split a signal from the optical fiber 204 into a plurality of optical fibers 202 that extend between the optical splitter 275 and the plurality of optical adapter assemblies 130. In one example, the optical splitter 275 allows a single optical signal to be split into multiple signals such as 1×N split, but other splitter arrangements are possible such as a 2×N split. In the embodiment depicted in FIG. 4, a signal from the single optical fiber 204 is split by the optical splitter 275 to four optical fibers 202 extending between the optical splitter 275 and four optical adapter assemblies 130. Other embodiments may include two splitter with the first splitter having an asymmetric power split ratio such as a 90/10 power level split with 90 percent leg of the split signal feeding downstream and the 10 percent split feeding a second splitter such as a 1×N splitter for distributing the optical signals to downstream users in the communication network. Other variations of the power-level splits are also possible. Further, the cavity 112 of the multiport assembly 100 may have other components disposed therein such as wavelength division multiplexing devices such as CWDM or DWDM devices.

Figure 5B:
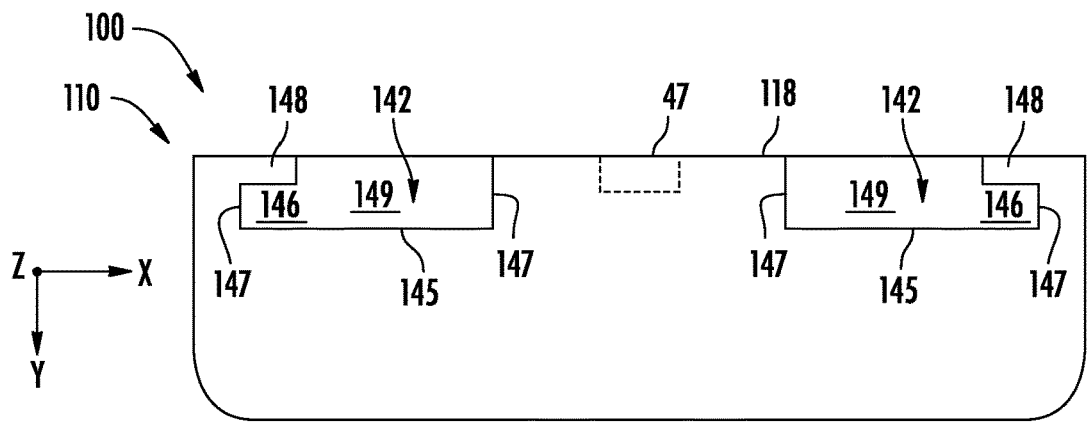
FIG. 5B schematically depicts an end view of the shell of the multiport assembly of FIG. 1, according to one or more embodiments shown and described herein.

Referring collectively to FIGS. 5A and 5B, a lower perspective view and an end view of the shell 110 are schematically depicted. In embodiments, the shell 110 defines at least one slot 142 positioned on a lower surface 118 of the shell 110 and extending in the longitudinal direction. In the embodiment depicted in FIGS. 5A and 5B, the shell 110 defines two slots 142 that are symmetric to one another about a multiport assembly centerline 10 that bisects the multiport assembly 100 in the lateral direction. The slots 142 each define a bottom face 145 positioned above the lower surface 118 of the shell 110 (i.e., in the +Y-direction). Each of the slots 142 further define opposing sidewalls 147 that extend downward from the bottom face 145 to the lower surface 118 (i.e., in the −Y-direction) of the shell 110. In particular, each of the slots 142 defines an inward-facing sidewall 147 (i.e., facing inward the centerline 10 in the lateral direction), and an opposing, outward-facing sidewall 147 (i.e., facing outward from the centerline 10 in the lateral direction). Each of the slots 142 define endfaces 149 positioned at the front end of the slots 142. The endfaces 149 are generally oriented to face rearward in the longitudinal direction (i.e., in the −Z-direction) and may restrict longitudinal movement of a mounting member positioned in the slots 142, as described in greater detail herein.

Each of the slots 142 further define one or more tabs 148 that extend over the bottom face 145 to define channels 146 that extend along the shell 110 in the longitudinal direction. The channels 146 of each of the slots 142 are generally bounded by the bottom face 145, a sidewall 147, and the tabs 148. Each of the slots 142 define cutouts 144 positioned between the tabs 148 in the longitudinal direction. At the cutouts 144, the sidewalls 147 may generally extend between the bottom face 145 of the slot 142 and the lower surface 118 of the shell 110 in the vertical direction. A mounting member may be selectively inserted into the slots 142 via the cutouts 144, as described in greater detail herein. In the embodiment depicted in FIGS. 5A and 5B, the slots 142 define tabs 148 and cutouts 144 positioned on the inward-facing sidewalls 147, however, it should be understood the tabs 148 and cutouts 144 may additionally or alternatively be positioned on the outward-facing sidewalls 147.

The shell 110 further defines a latch recess 150 extending upward into the lower surface 118 of the shell 110. The latch recess 150 defines a latch engagement face 152 that is oriented to face forward in the longitudinal direction (i.e., in the +Z-direction). The latch recess 150 further defines a recess surface 156 positioned below the latch engagement face 152. The recess surface 156 is oriented transverse to the latch engagement face 152 and extends forward from the recess surface 156 in the longitudinal direction (i.e., in the +Z-direction). In embodiments, the latch recess 150 further includes a ramp 154 that extends downward from the recess surface 156 to the lower surface 118 of the shell 110 (i.e., in the −Y-direction). The latch recess 150 may engage a latch of a mounting member to selectively couple the mounting member to the shell 110, as described in greater detail herein.

The shell 110 may also define one or more perimeter through slots 158 extending through the shell 110 in the vertical direction that may also receive a band or belt to fasten the multiport assembly 100 to a post or utility pole. Beyond these perimeter through slots 158, the multiport assembly 100 disclosed herein may also include a mounting member that attaches in any suitable manner to the shell 110 for further mounting options.

Figure 6A:
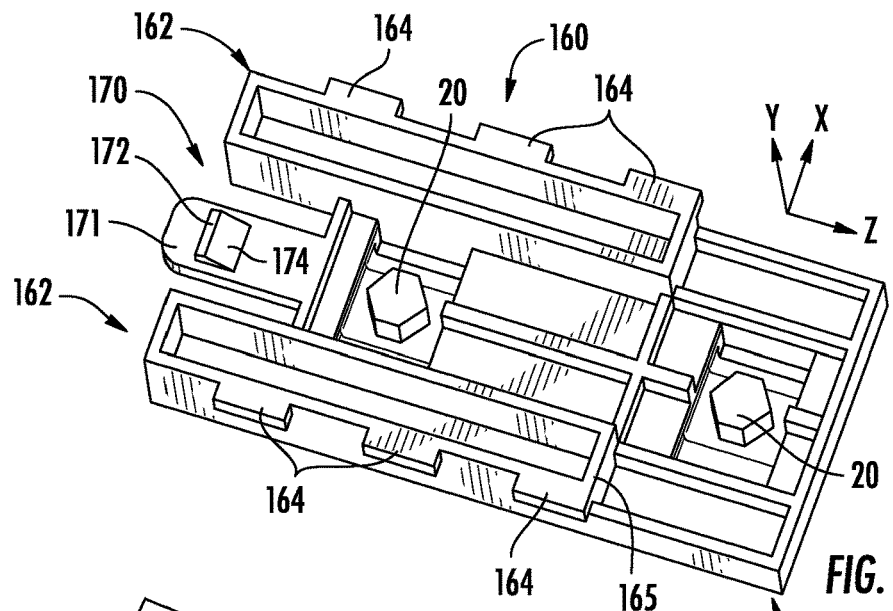
FIG. 6A schematically an upper perspective view of a mounting member of the multiport assembly of FIG. 1, according to one or more embodiments shown and described herein.
Figure 6B:
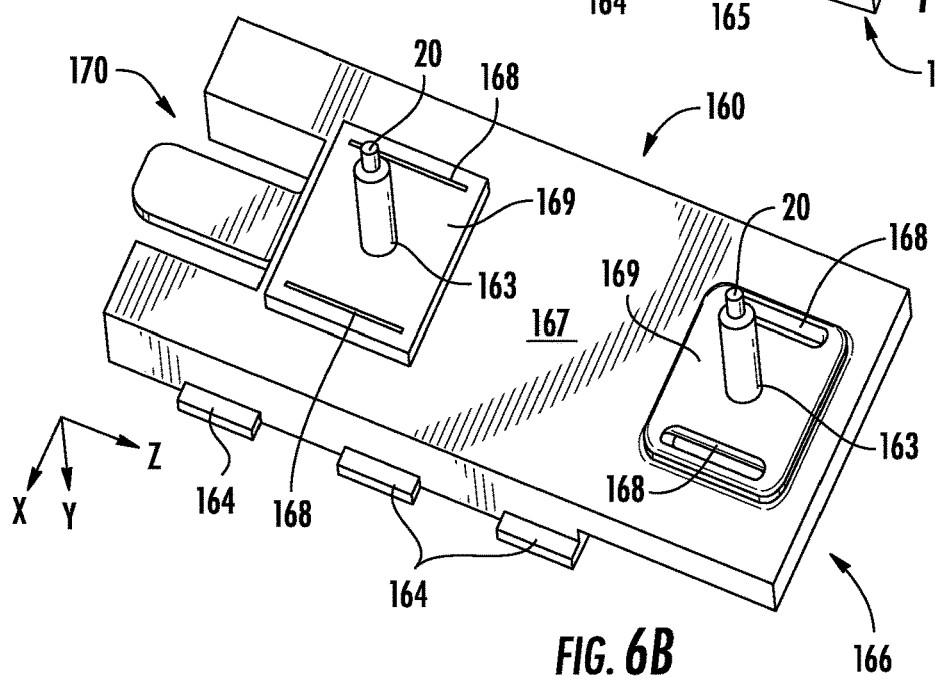
FIG. 6B schematically a lower perspective view of the mounting member of the multiport assembly of FIG. 1, according to one or more embodiments shown and described herein.

Referring to FIGS. 6A and 6B, an upper and a lower perspective view of an example mounting member 160 are schematically depicted, respectively. The mounting member 160 generally includes one or more multiport engagement portions 162, a mounting portion 166, and a latch 170. The multiport engagement portions 162 are sized and shaped to correspond to the slots 142 (FIGS. 5A and 5B) of the shell 110 of the multiport assembly 100, and each multiport engagement portion 162 includes one or more slot engagement tabs 164 extending outward from the multiport engagement portions 162. The slot engagement tabs 164 are sized and shaped to be positioned within the channels 146 (FIG. 5B) of the slots 142 and to engage with the tabs 148 (FIG. 5B) of the shell 110 of the multiport assembly 100. The multiport engagement portions 162 further define a mounting member endface 165 that is oriented to face forward in the longitudinal direction (i.e., in the +Z-direction). In embodiments, the mounting member endface 165 may engage the endfaces 149 (FIGS. 5A and 5B) of the slots 142 of the shell 110 to restrict longitudinal movement of the mounting member 160 with respect to the shell 110, as described in greater detail herein.

The latch 170 generally includes a latch tab 171 and a multiport engagement face 172 that extends outward from the latch tab 171 in the vertical direction and that is oriented to face in the rearward longitudinal direction (i.e., in the −Z-direction). In embodiments, the multiport engagement face 172 is engageable with the latch engagement face 152 (FIG. 5A) to selectively restrict movement of the mounting member 160 with respect to the shell 110 (FIG. 5A) in the longitudinal direction, as described in greater detail herein. In embodiments the latch 170 further includes a ramp 174 that extends upward from the multiport engagement face 172 to the latch tab 171 (i.e., in the +Y-direction). The ramp 174 may engage the shell 110 (FIG. 5A) to selectively deform the latch tab 171 outward form the shell 110 such that the latch 170 may be moved into the latch recess (FIG. 5A), as described in greater detail herein.

The mounting portion 166 of the mounting member 160 generally includes an outward face 167 and one or more standoffs 169 extending outward from the outward face 167. Each of the one or more standoffs 169 may define a corresponding aperture 163 through which a fastener 20 may be inserted. In the embodiment depicted in FIGS. 6A and 6B, the mounting portion 166 includes two standoffs 169, each of the standoffs 169 including a fastener 20 inserted within an aperture 163 of the standoff 169. In embodiments, the fastener 20 may include any suitable mechanical fastener, such as a screw or the like. While the embodiment depicted in FIGS. 6A and 6B includes two standoffs 169 that are spaced apart from one another in the longitudinal direction, it should be understood that the mounting member 160 may include a single standoff 169 and corresponding aperture 163, or may include multiple standoffs 169 with corresponding apertures 163.

In the embodiment depicted in FIGS. 6A and 6B each of the standoffs 169 define strap apertures 168 extending through the mounting member 160. In embodiments, the mounting member 160 may be installed to a surface, such as a wall, a utility pole, or the like. For example, the mounting member 160 may be attached to a surface either by the fasteners 20 or by a zip-tie, belt, strap the like extending through the strap apertures 168. Because the standoffs 169 extend outward from the outward face 167, as the mounting member 160 is attached to the surface, the standoffs 169 may engage the surface, while the outward face 167 of the mounting member 160 and the lower surface 118 (FIG. 5B) of the shell 110 are spaced apart from the surface. As the mounting member 160 is attached to the surface, components of the mounting member 160 in contact with the surface may tend to deform to match the contours of the surface, particularly when force is applied to engage and secure the multiport assembly 100 (FIG. 1) to the surface. Because the standoffs 169 act to space the outward face 167 of the mounting member 160 and the lower surface 118 (FIG. 5B) of the shell 110 apart from the surface, the standoffs 169 may limit deformation of the outward face 167 and the lower surface 118 of the shell 110, thereby assisting in maintaining the structural integrity of the multiport assembly 100 as it is fastened to a surface.

In embodiments, the mounting member 160 may be formed from any suitable material, such as a polymer, a composite, a resin, or the like, and may be formed through any suitable process, such as and without limitation molding or the like. In some embodiments, the mounting member 160 is formed of the same material as the shell 110 (FIG. 5A) of the multiport assembly 100. In some embodiments, the mounting member 160 is formed of a different material than the shell 110 (FIG. 5A) of the multiport assembly 100.

Referring to FIG. 7, a perspective view of the mounting member 160 and the shell 110 of the multiport 100 are schematically depicted. To install the mounting member 160 to the shell 110, the slot engagement tabs 164 of the mounting member 160 are aligned with the cutouts 144 of the slots 142. With the slot engagement tabs 164 aligned with the cutouts 144, latch 170 is positioned rearward of the latch recess 150 in the longitudinal direction (i.e., in the −Z-direction). The slot engagement tabs 164 may be inserted into the cutouts 144 of the slots 142, and the mounting member 160 may be slid forward in the longitudinal direction (i.e., in the +Z-direction) such that the slot engagement tabs 164 are positioned within the channels 146 (FIG. 5B) and engaged with the tabs 148. As the mounting member 160 moves forward in the longitudinal direction, the mounting member endface 165 engages the endfaces 149 of the slots 142, restricting movement of the mounting member 160 in the +Z-direction.

Figure 8:
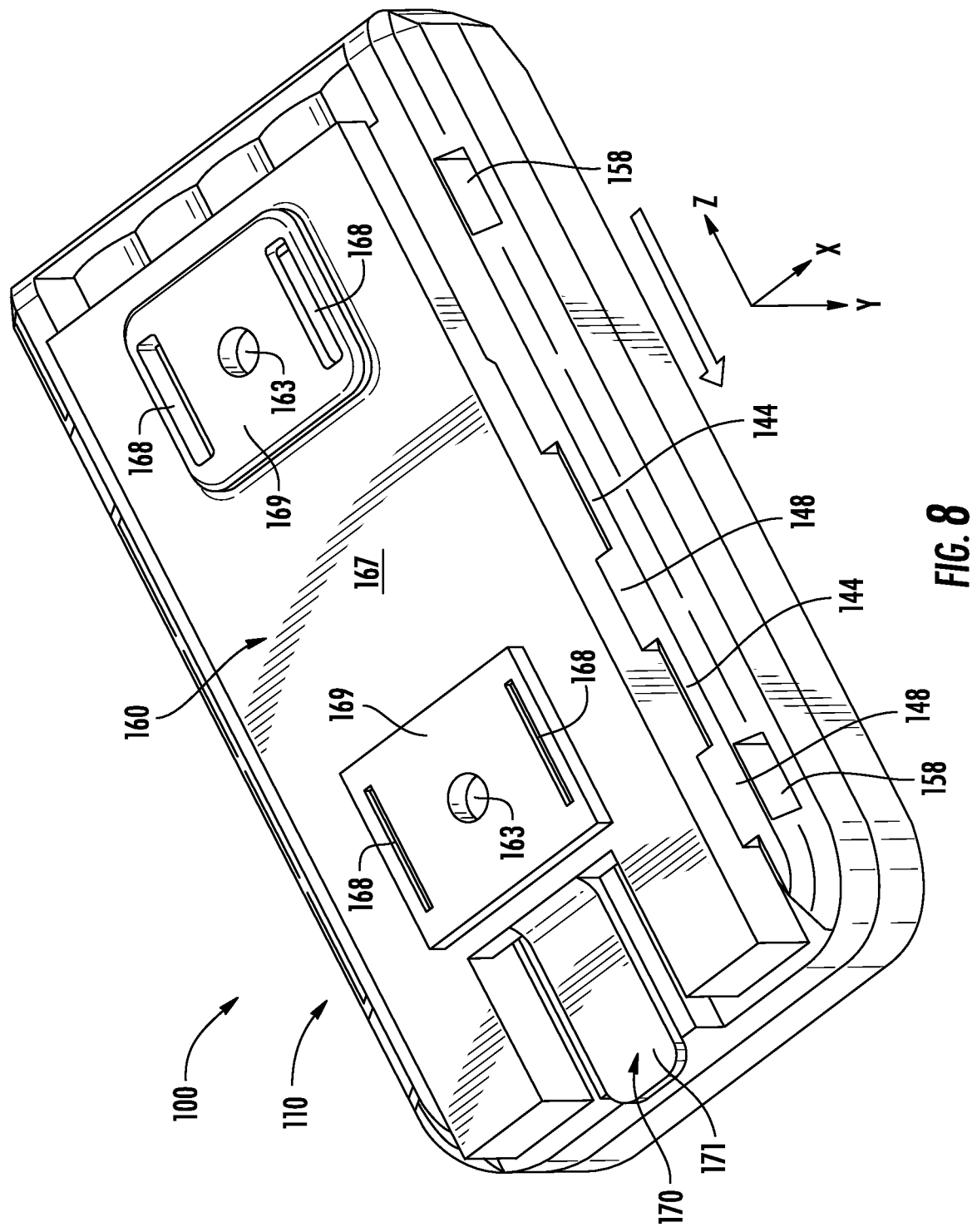
FIG. 8 schematically depicts the mounting member assembled to the shell of the multiport assembly of FIG. 1, according to one or more embodiments shown and described herein.
Figure 9:
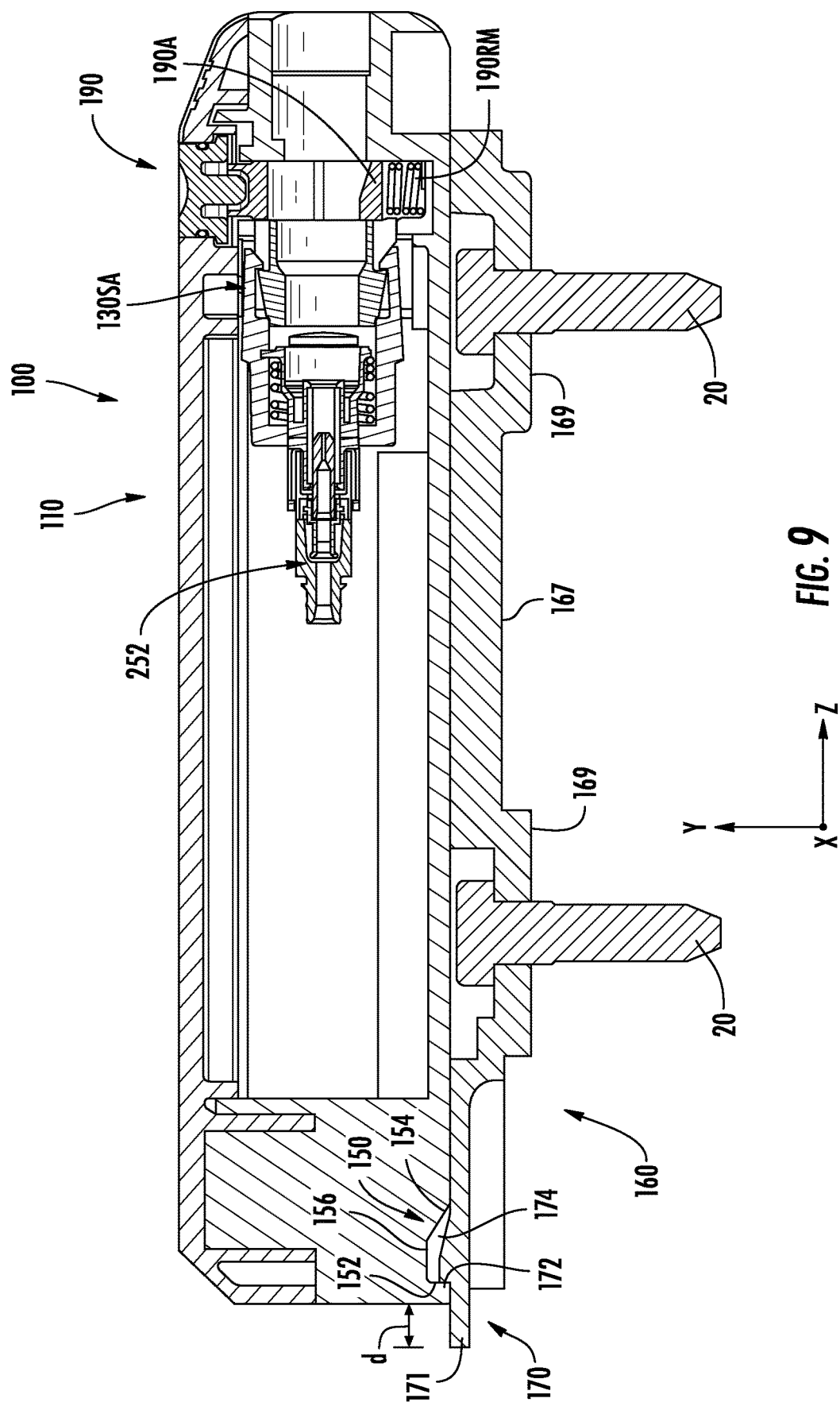
FIG. 9 schematically depicts section view of the multiport assembly along section 9-9 of FIG. 1, according to one or more embodiments shown and described herein.

As the mounting member 160 moves forward in the longitudinal direction, the latch 170 is engaged with the latch recess 150 of the shell 110. For example and referring to FIGS. 8 and 9, a perspective view and section view of the mounting member 160 installed to the shell 110 along section 9-9 of FIG. 1 are schematically depicted, respectively. As the mounting member 160 moves forward in the longitudinal direction, the ramp 174 of the latch 170 engages the shell 110, and the latch 170 may elastically deform outward and away from the shell 110 (i.e., in the −Y-direction). As the mounting member 160 continues to move forward, the ramp 174 and the multiport engagement face 172 of the latch 170 are positioned within the latch recess 150. More particularly, the multiport engagement face 172 of the latch 170 engages the latch engagement face 152 of the shell 110, thereby restricting rearward movement of the mounting member 160 in the longitudinal direction (i.e., in the −Z-direction). In some embodiments, the latch 170 may extend beyond the shell 110 by a distance d in the longitudinal direction, which may assist in ensure that a user may access the latch 170 to selectively release the shell 110 from the mounting member 160, for example by deforming the latch 170 outward and away from the shell 110 to disengage the multiport engagement face 172 from the latch engagement face 152. Through engagement between the multiport engagement face 172 and the latch engagement face 152, and through engagement between the mounting member endface 165 (FIG. 7) and the endface 149 (FIG. 7) of the slots 142, forward and rearward movement of the mounting member 160 in the longitudinal direction is restricted. Furthermore, outward movement of the mounting member 160 with respect to the shell 110 is restricted through engagement between the slot engagement tabs 164 (FIG. 7) of the mounting member 160 and the tabs 148 of the shell 110. In this way, the mounting member 160 may be selectively coupled to the shell 110.

As the mounting member 160 may be selectively coupled to the shell 110, the mounting member 160 may be installed to a surface, for example a wall or a utility pole, and then the shell 110 may subsequently be selectively coupled to the mounting member 160. By installing the mounting member 160 to the surface first, the amount of debris from the installation process (e.g., dirt or dust from installing the fasteners) exposed to the multiport assembly 100 may be reduced.

Figure 10:
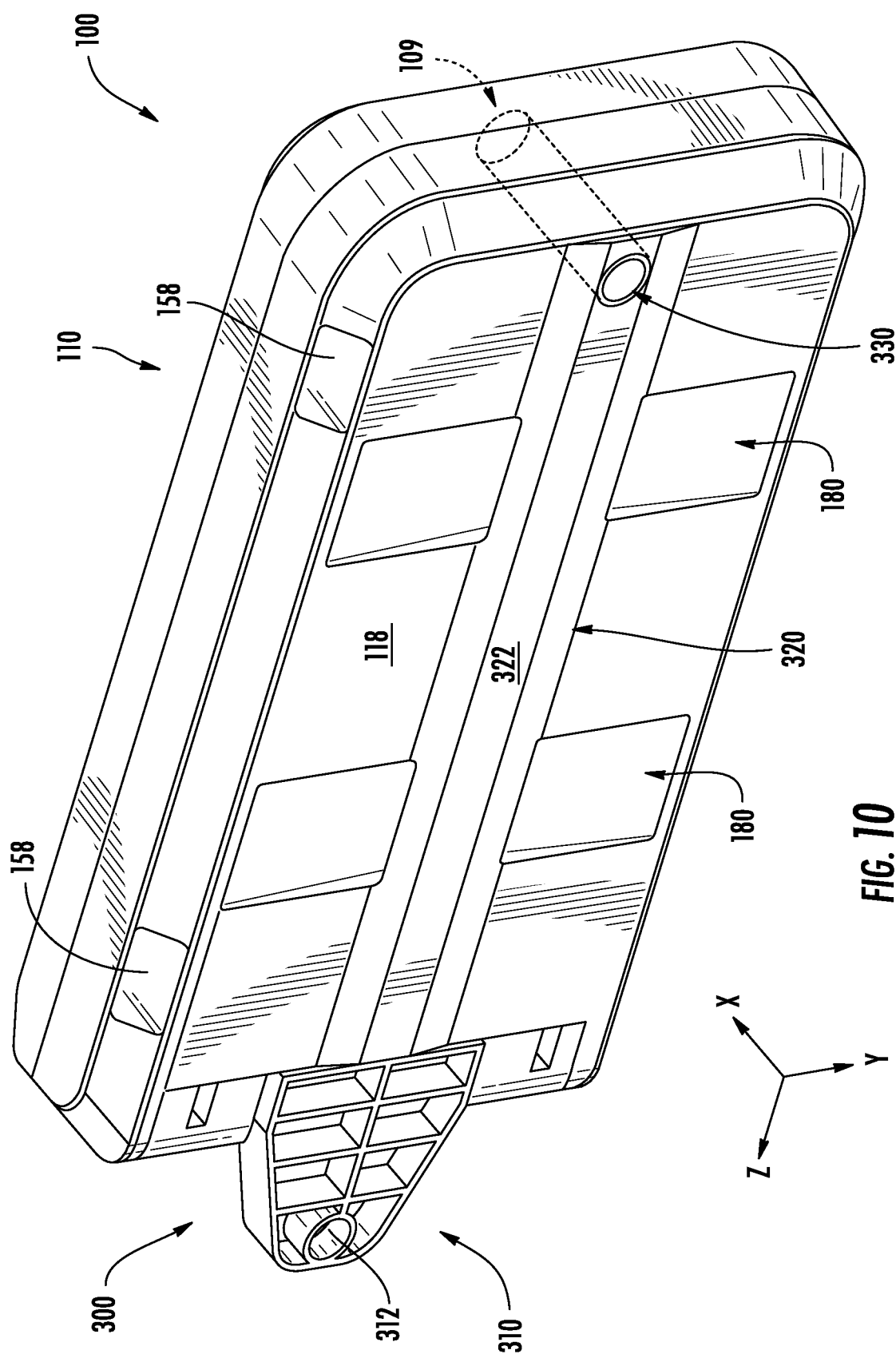
FIG. 10 schematically depicts a lower perspective view of another mounting member assembled to a multiport assembly, according to one or more embodiments shown and described herein.

Referring to FIG. 10, a lower perspective view of another multiport assembly 100 including another mounting member 300 is schematically depicted. In the embodiment depicted in FIG. 10, the shell 110 of the multiport assembly 100 defines one or more lateral slots 180 that extend inward from the lower surface 118 of the shell 110. The one or more lateral slots 180 generally extend along the lower surface 118 of the shell 110 in the lateral direction. The lateral slot 180 is arranged into back-to-back portions that extend inward toward the middle on the lower side for allowing a smooth insertion of a strap, tie-wrap, belt or the like thru an aperture to secure the multiport assembly 100.

In this embodiment, the lateral slots 180 cooperate with the longitudinal member 320 to form a strap aperture (not numbered) through a lower portion of the shell 110 for securing the multiport assembly 100 in a first manner. The multiport assemblies 100 may also be secured in a second manner using one or more apertures in the shell 210.

In the embodiment depicted in FIG. 10, the mounting member 300 generally includes a forward tab 310 that extends forward from the shell 110 in the longitudinal direction (i.e., in the +Z-direction). The forward tab 310 generally defines an aperture 312 extending through the forward tab 310 and through which a fastener may be inserted to secure the multiport assembly 100 to a surface, such as a wall, a utility pole, or the like. The mounting member 300 further includes a longitudinal member 320 that is integral with the forward tab 310 extends along the lower surface 118 of the shell 110. In embodiments, the longitudinal member 320 extends over and partially covers the one or more lateral slots 180. In embodiments, a band, a strap, or the like, may be inserted between the longitudinal member 320 and the one or more lateral slots 180 to secure the multiport assembly 100 to a surface, such as a utility pole or the like. The longitudinal member 320 extends outward from the shell 110, forming a standoff 322 that is spaced apart from the lower surface 118 in the vertical direction. Similar to the embodiment described above with respect to FIGS. 1-9, when the multiport assembly 100 is secured to a surface, the standoff 322 may contact and engage the surface while the lower surface 118 of the shell 110 is spaced apart from the surface. The standoff 322 may thereby limit contact between the multiport assembly 100 with the surface, limiting deformation of the shell 110 of the multiport assembly 100, as described above.

In the embodiment depicted in FIG. 10, the mounting member 300 further defines a rear aperture 330 positioned rearward of the forward tab 310. In some embodiments, the rear aperture 330 is positioned at the rear end 104 of the shell 110 when the mounting member 300 is assembled to the shell 110 and aligns with a rear shell aperture 109 that extends through the shell 110. In other words, there is a through-hole from the lower side to the upper-side of the shell 110. A fastener may be inserted through the rear shell aperture 109 and the rear aperture 330 of the mounting member 300 to secure the multiport assembly 100 to a surface. In embodiments, the rear aperture 330 of the mounting member 300 may be defined by a bushing 332 that extends at least partially within the rear shell aperture 109. The bushing 332 may reduce stress applied to the shell 110, such as by a fastener inserted within the rear shell aperture 109 to secure the multiport assembly 100 to a surface. In one embodiment, bushing may be slightly longer than the height H of the multiport assembly so that bushing can carry any compressive loading applied by the fastener and inhibits damage to the shell 110.

In embodiments, the mounting member 300 may be coupled to the shell 110 in any suitable manner, for example through adhesive, sealant, welding, overmolding, or the like. In some embodiments, the mounting member 300 may be coupled to the shell 110 by a snap-fit or the like.

Figure 11:
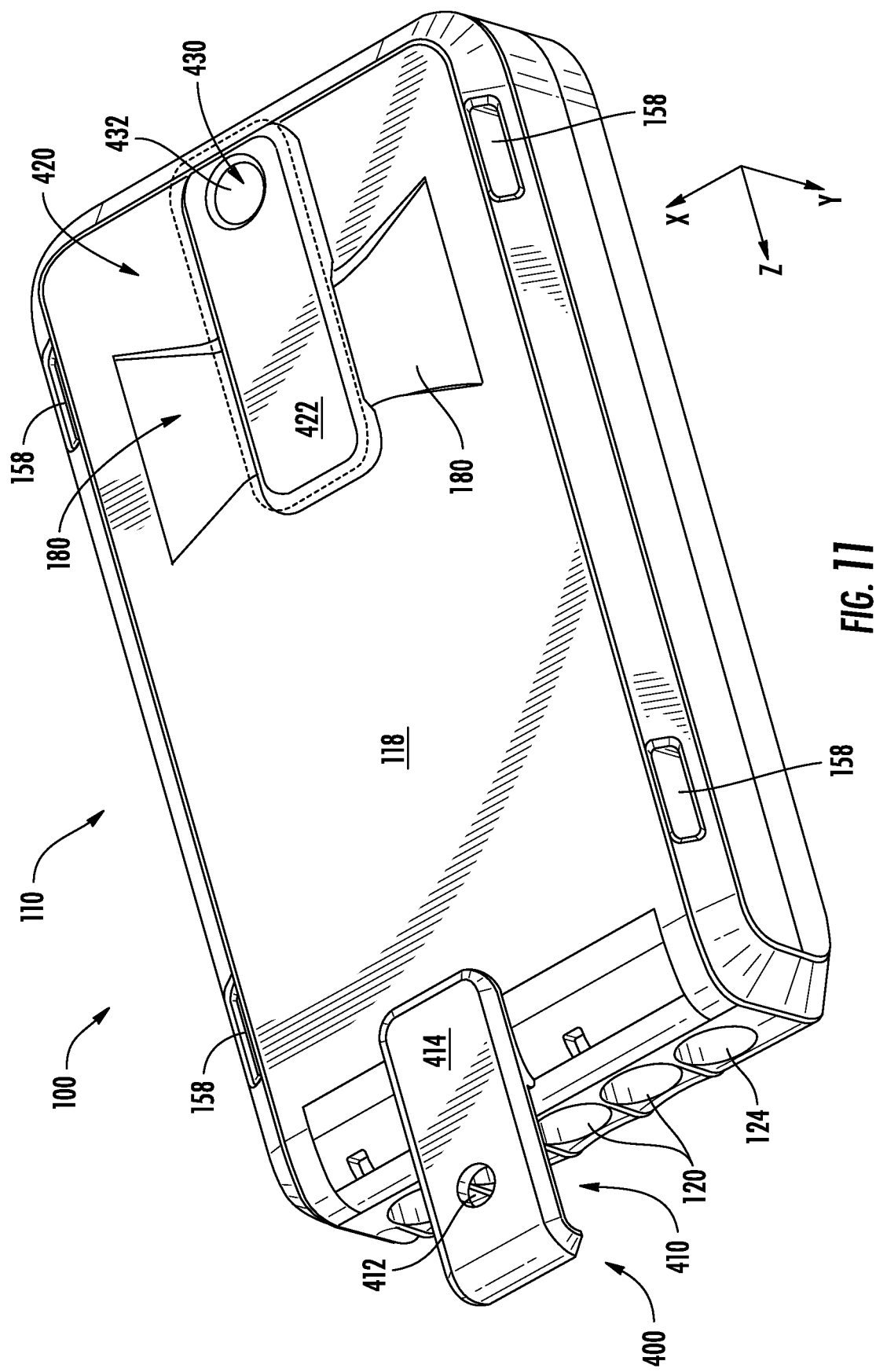
FIG. 11 schematically depicts a lower perspective view of another mounting member assembled to a multiport assembly, according to one or more embodiments shown and described herein.
Figure 16:
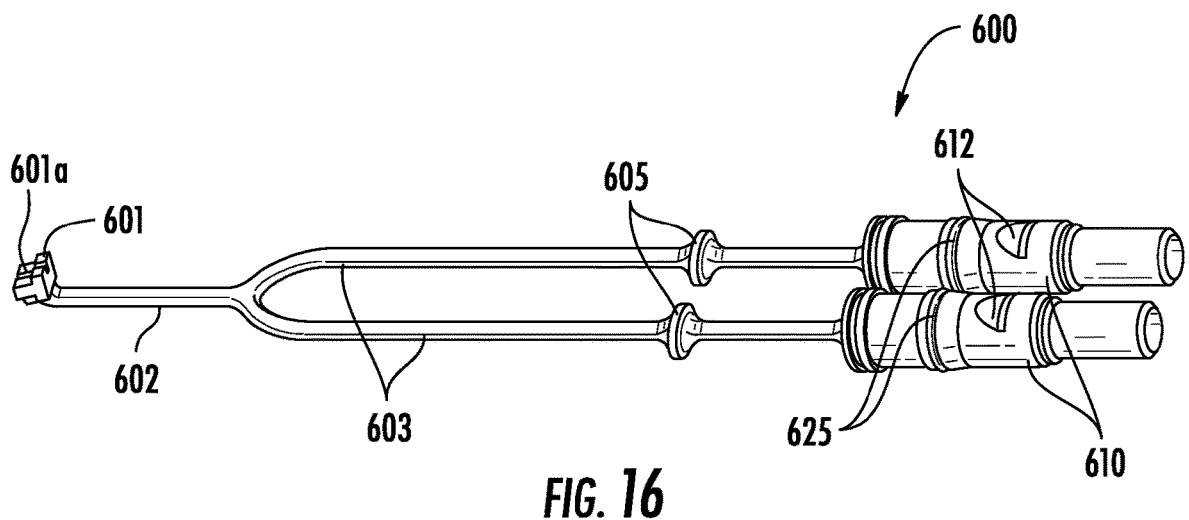
FIG. 16 is a perspective view of the dust plug with the tether of FIGS. 12-14 from a first angle to show the locking features of the dust plug body.
Figure 17:
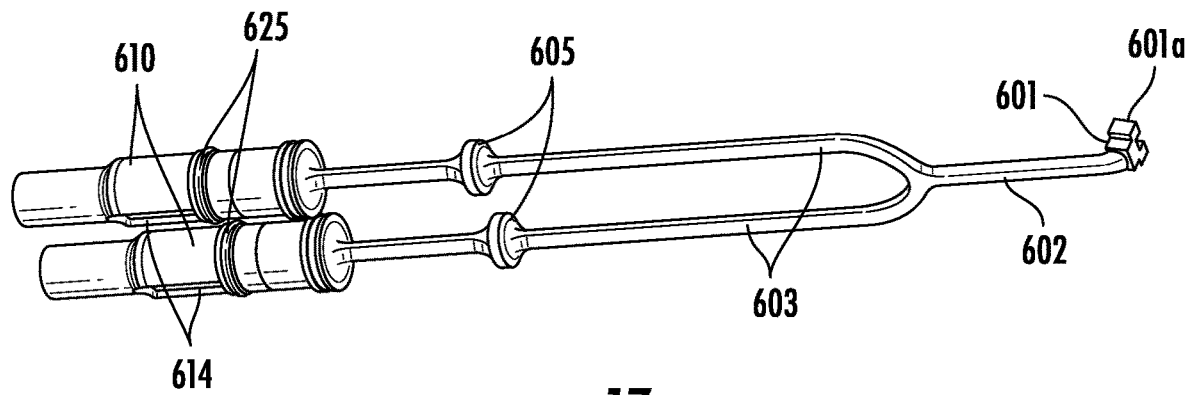
FIG. 17 is a perspective view of the dust plug with the tether of FIGS. 12-14 from a second angle to show the keying features of the dust plug body.
Figure 18:
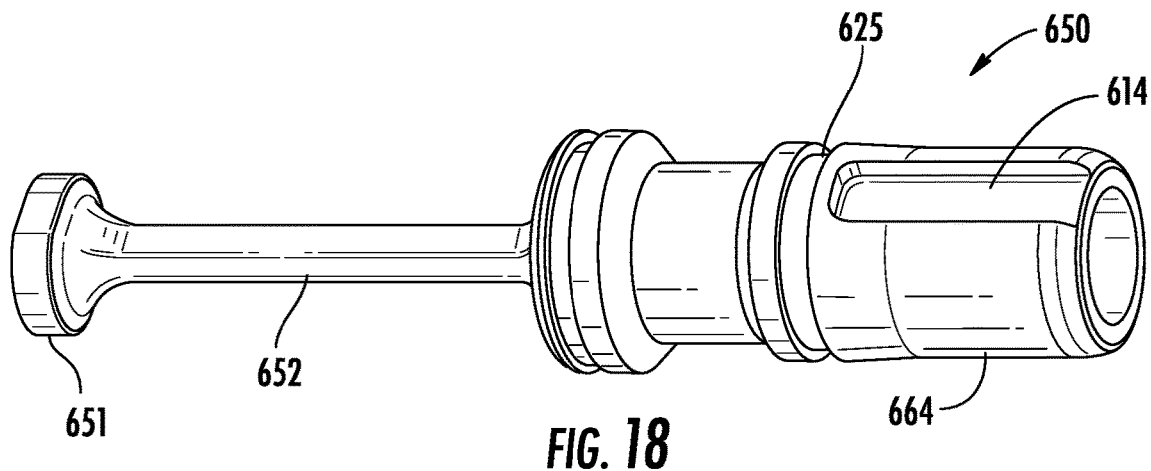
FIGS. 18 and 19 are perspective views showing details of the second dust plug of FIG. 15.
Figure 19:
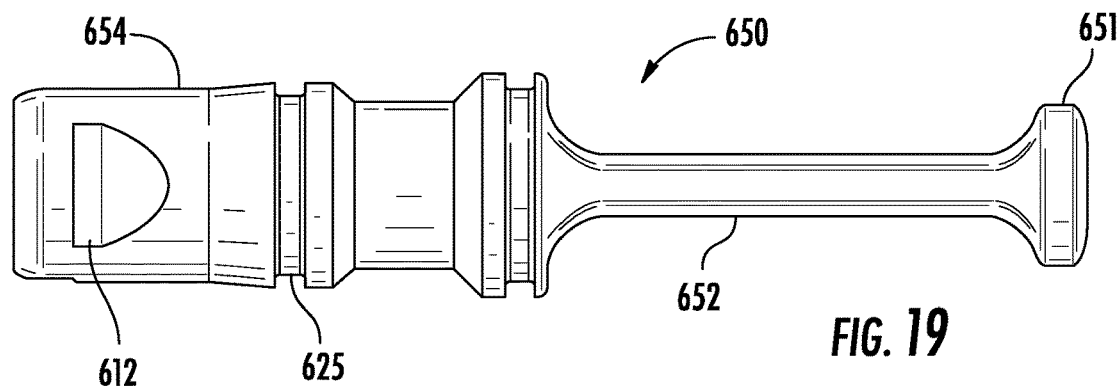

Referring to FIGS. 11 and 12, a lower perspective view and an exploded view of a multiport assembly 100 with another mounting member 400 are depicted, respectively. FIG. 12 further depicts an explanatory dust plug 600 comprising a tether that may be attached to the multiport assembly 100 if desired; however, other types of dust plugs may be used with any of the multiport assemblies 100 disclosed herein. When installed, the dust plugs inhibit dirt, dust or debris from entering the optical connector ports 120 or the input connector port 124. FIGS. 16 and 17 show further views of the dust plug 600 and FIGS. 18 and 19 depict a dust plug 650 that has a pulling grip 652, but does not include a tether. Other dust plug features or designs are also shown in FIGS. 20-33. Dust plugs disclosed herein include a body having a locking feature and a keying portion. The locking feature of the dust plug is used for engaging with a portion of multiport. The keying portion of the dust plug is disposed about 180 degrees from the locking feature as depicted for aligning the locking feature within the optical connector port. The dust plugs having tethers may be attached to multiport assemblies to prevent loss as shown if desired or not. FIGS. 12A and 12B depict explanatory modular optical adapter assemblies 130SA that may be aligned to the connector ports 120, 124 of the shell 110 using one or more alignment features formed in the shell 210.

Similar to the embodiment described above and depicted in FIG. 10, the mounting member 400 includes the forward tab 410 extending forward from the shell 110, the forward tab 410 including the aperture 412 extending through the forward tab 410. The mounting member 400 further includes the longitudinal member 420 extending along the lower surface 118 of the shell 110 in the longitudinal direction. In the embodiment depicted in FIGS. 11 and 12, the longitudinal member 420 defines the rear aperture 430 extending through the longitudinal member 420.

In the embodiment depicted in FIGS. 11 and 12, the longitudinal member 420 defines the standoff 422 that is spaced apart from the lower surface 118 of the shell 110. However, in the embodiment depicted in FIG. 11, the longitudinal member 420 and the forward tab 410 are formed as separate components that are spaced apart from one another when installed to the shell 110 of the multiport assembly 100. The longitudinal member 420, and accordingly the standoff 422, extends along a discrete portion of the shell 110 in the longitudinal direction (i.e., the standoff 422 does not extend along the entire lower surface 118 of the shell 110). By extending only partially along the lower surface 118 of the shell 110, when the multiport assembly 100 is coupled to a surface, contact between the longitudinal member 420 and the surface is limited, which assists in reducing the deformation of longitudinal member 420 and the shell 110 as result of contact with a securing surface.

In embodiments, the forward tab 410 may define a forward standoff 414 that is spaced apart from the lower surface 118 of the shell 110. Like the standoff 422 of the longitudinal member 420, when the multiport assembly 100 is secured to a surface, the forward standoff 414 may contact and engage the surface, while the lower surface 118 of the shell 110 remains spaced apart from the surface. In embodiments, the forward standoff 414 and the standoff 422 of the longitudinal member 420 are aligned with one another in in the X-Z plane as depicted, so that the forward standoff 414 and the standoff 422 of the longitudinal member 420 collectively provide a level mounting surface for the multiport assembly 100. The lateral slot 180 having portions arranged back-to-back to extend inward toward the middle on the lower side allow a smooth insertion of a strap, tie-wrap, belt or the like. In this embodiment, the lateral slot 180 cooperates with longitudinal member 420 for forming a thru an aperture once the longitudinal member 420 is attached to the shell 110. The longitudinal member 420 may be attached or coupled in any suitable fashion. In one embodiment, only the area about a bushing 432 is attached or coupled to the shell in a suitable fashion such as adhesive, welding or the like, the other end is not attached so the cantilevered end may deflect. By attaching the longitudinal member 420 to the shell 110 with the cantilevered end it allows the member to deflect as needed instead of carrying unnecessary stress that could break or be damaged under excessive loading. Moreover, the bushing may be longer than the height H of the multiport assembly to inhibit damage to the shell from a fastener.

Figure 13:
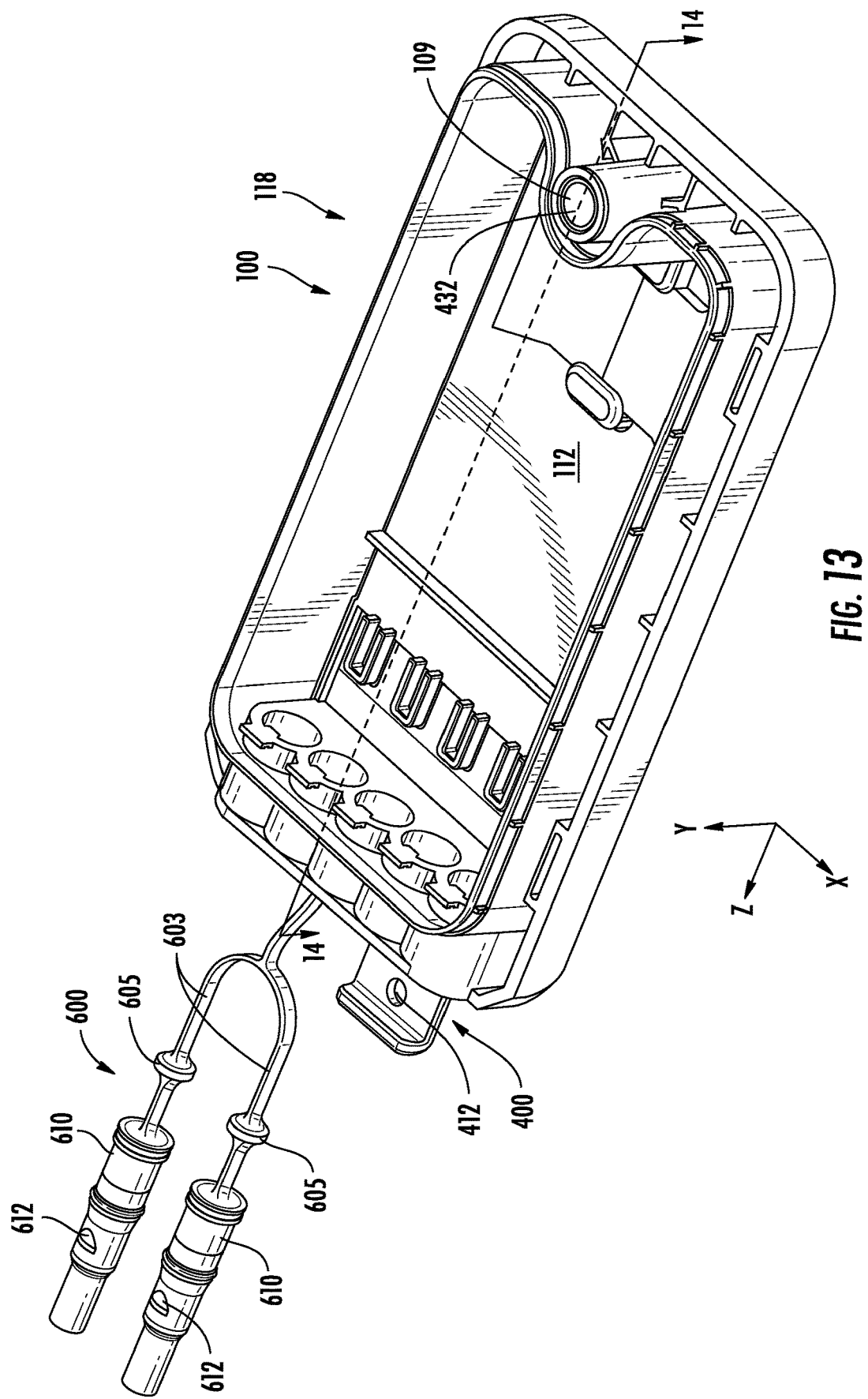
FIG. 13 schematically depicts an upper perspective view of the mounting member and the dust plug with the tether secured to the multiport assembly of FIG. 11, according to one or more embodiments shown and described herein.
Figure 31:
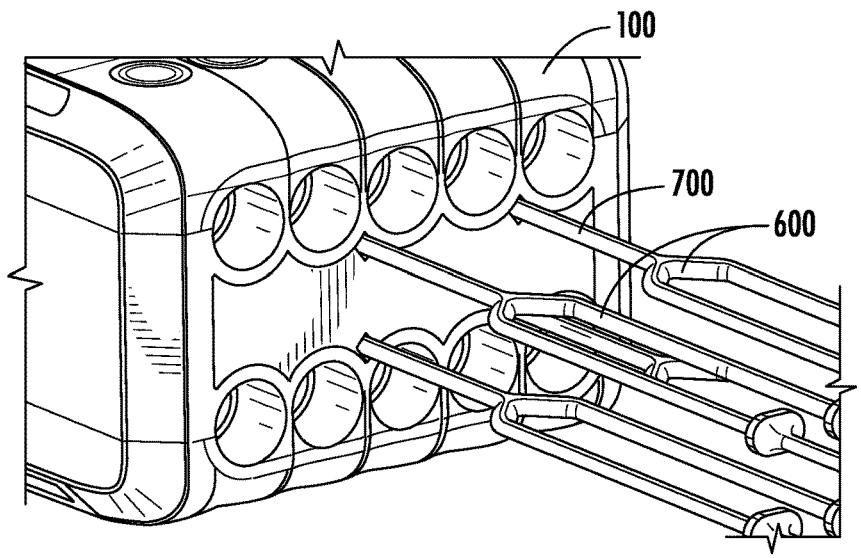
Figure 33:
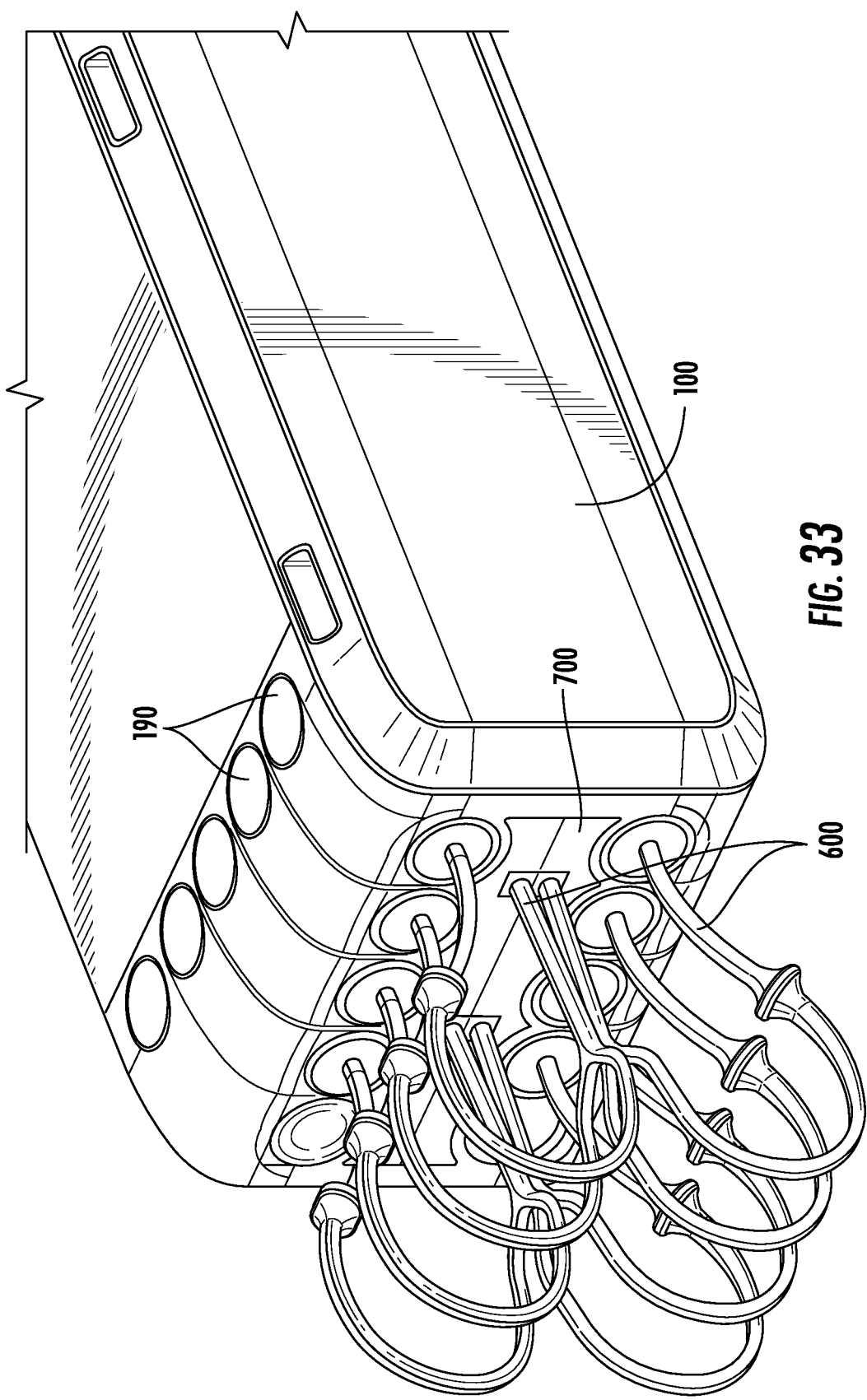

FIG. 12 also depicts dust plug 600 having a dust plug body 610 and a dust plug tether (not numbered). As shown, the dust plug body is attached to the dust plug tether. In this embodiment, the dust plug has a wishbone design with a plurality of dust plug bodies 610 attached to respective legs 603 of the dust plug tether. Consequently, multiple dust plug bodies 610 may be attached to the multiport assembly at a single point. For instance, if four dust plug bodies are desired for the multiport assembly, then less than four attachments of tethers are needed such a two attachments with each dust plug 600 having two dust plug bodies 610. To that end, respective legs 603 of the dust plug tether are attached to a respective dust plug body 610 as shown. Each leg 603 is attached to a runner 602 (FIG. 16) having an end 601 of the dust plug tether. Thus, the mounting member or faceplate may capture a portion of the dust plug tether between the faceplate and the shell of the multiport as shown in FIG. 27, 31 or 33 or between the mounting member and the shell of the multiport as shown in FIG. 13. Dust plugs may also include a gripping portion 605 disposed between the dust plug body 610 and the end 601 of the dust plug tether as depicted. The gripping portion 605 aids in the removal of the dust plug from the optical connector port 120 when depressing the push-button 190 by providing a portion to grip and pull for removal.

FIGS. 12A and 12B depict details of modular optical adapter assembly 130SA that may be used with the multiport assemblies 100 disclosed herein if desired with the rear connector 252 that is internal to the multiport assembly 100. Modular optical adapter assemblies 130SA enable quick and easy assembly of the multiport assemblies 100 in a scalable manner. As discussed, the modular optical adapter assemblies 130SA also allow the mating components such as the adapters 134A corresponding to the respective connector port 120, 124 to move or "float" independently of the other modular optical adapter assemblies 130SA relative to the shell 110 for preserving optical performance. Modular optical adapter assemblies 130SA that may be aligned to the connector ports 120, 124 of the shell 110 and allowed to have slight movement within the one or more alignment features formed in the shell 210. For instance, FIG. 12 depicts a row of alignment features disposed behind the opening for push-buttons 190 configured as pockets (not numbered) for receiving complementary alignment features on the top of the modular optical adapter assembly 130SA, and FIG. 13 shows a row of alignment features the connector ports 120, 124 configured as a U-shaped protrusions (not numbered) on the shell for receiving complementary alignment features on the bottom of the modular optical adapter assembly 130SA. Other suitable alignment features may be integrally formed in the cavity 112 of shell 110 if desired or have separate component that aid with alignment.

Modular optical adapter assemblies 130SA comprise adapter 134A aligned with the respective connector port 120, 124 when assembled. By way of example, the top of the modular optical adapter assemblies may have alignment features 131AFT that are inserted into the pockets of the shell 110. Likewise, the bottom of the modular optical adapter assemblies may have alignment feature such as a recessed portion that cooperates with the U-shaped protrusions of shell 110. Adapter 134A may be biased by a resilient member 136RM and the adapter 134A may be secured to an adapter body 131 using a retainer 137. As best shown in FIG. 12B, modular optical adapter assembly 130SA comprises securing element 190A and securing element resilient member 190RM. However, other embodiments could comprise an actuator for translating the securing element 190A.

As depicted, securing member 190A is inserted into a front end of adapter body 131 along with securing element resilient member 190RM. Specifically, a rim (not numbered) of securing member 190 is inserted into a hoop 131H of adapter body 131, and standoffs 190SO are disposed in a portion of the resilient member pocket (not numbered) at the bottom of the adapter body 131. Securing element resilient member 190RM is disposed in the resilient member pocket as shown in FIG. 12A for biasing the securing member 190A to a retain position as shown. This construction advantageously keeps the assembly intact using the securing element resilient member 190RM. Standoffs 190SO of adapter body 131 may also act as stops to limit the translation of securing element 190A.

In this embodiment, modular optical adapter assembly 130SA may also comprise a ferrule sleeve FS, a ferrule sleeve retainer 135R, resilient member 136RM, a retainer 137 along with the adapter 134A. Adapter body 131 has a portion of the connector port passageway disposed therein for receiving a portion of the external optical connector 210. Ferrule sleeve retainer 135R and ferrule sleeve FS are aligned for assembly into the adapter 134A for assembly and seated using the ferrule sleeve retainer 135R. The resilient member 136RM is disposed over a barrel of adapter 134A and seated on the flange of adapter 134A, then retainer 137 can be attached to adapter body 131 using its latch arms 137LA to secure the same. Other variations of the modular optical adapter assembly 130SA are possible.

As best shown in FIG. 12A, the securing element 190A comprises a locking feature 190L. Locking feature 190L cooperates with a portion of the optical connector 210 when it is fully-inserted into the respective connector port 120, 124 for securing the same. Specifically, the connector housing of optical connector 210 may have a cooperating geometry that engages the locking feature 190L of securing element 190A. The locking feature 190L may be disposed within the bore 190B of the securing element 190A.

In one embodiment, locking feature 190L comprises a ramp as shown. The ramp may be disposed within the bore 190B of the securing element 190A. For instance, the ramp is integrally formed at a portion of the bore 190B with the ramp angling up when looking into the connector port 120, 124. The ramp allows the connector to push and translate the securing element 190A downward against the securing element resilient member 190RM as the connector is inserted into the connector port 120, 124. Ramp may have any suitable geometry. For instance, the ramp may have an incline that leads to a horizontal portion. Once the locking feature 190L of the securing element 190A is aligned with the cooperating geometry of the connector, then a portion of the securing element 190A translates so the locking feature 190L engages the locking feature of the connector for securing the optical connector 210 in the respective connector port 120, 124.

Locking feature 190L comprises a retention surface (not visible). In one embodiment, the backside of the ramp of the locking feature 190L forms a ledge that cooperates with complimentary geometry on the connector housing of optical connector 210. However, retention surface may have different surfaces or edges that cooperate for securing the connector for creating the desired mechanical retention. For instance, the retention surface may be canted or have a vertical wall for tailoring the pull-out force for the connector port. However, other geometries are possible for the retention surface. Additionally, the connector port 120, 124 has a sealing location at the connector port passageway with an O-ring on the connector that is located closer to the connector port opening than the securing element 190 or locking feature 190L. In other words, the connector port has a sealing surface for the connector disposed at a distance from the connector port opening so it seals to the shell 110 of the multiport assembly 100.

Figure 14:
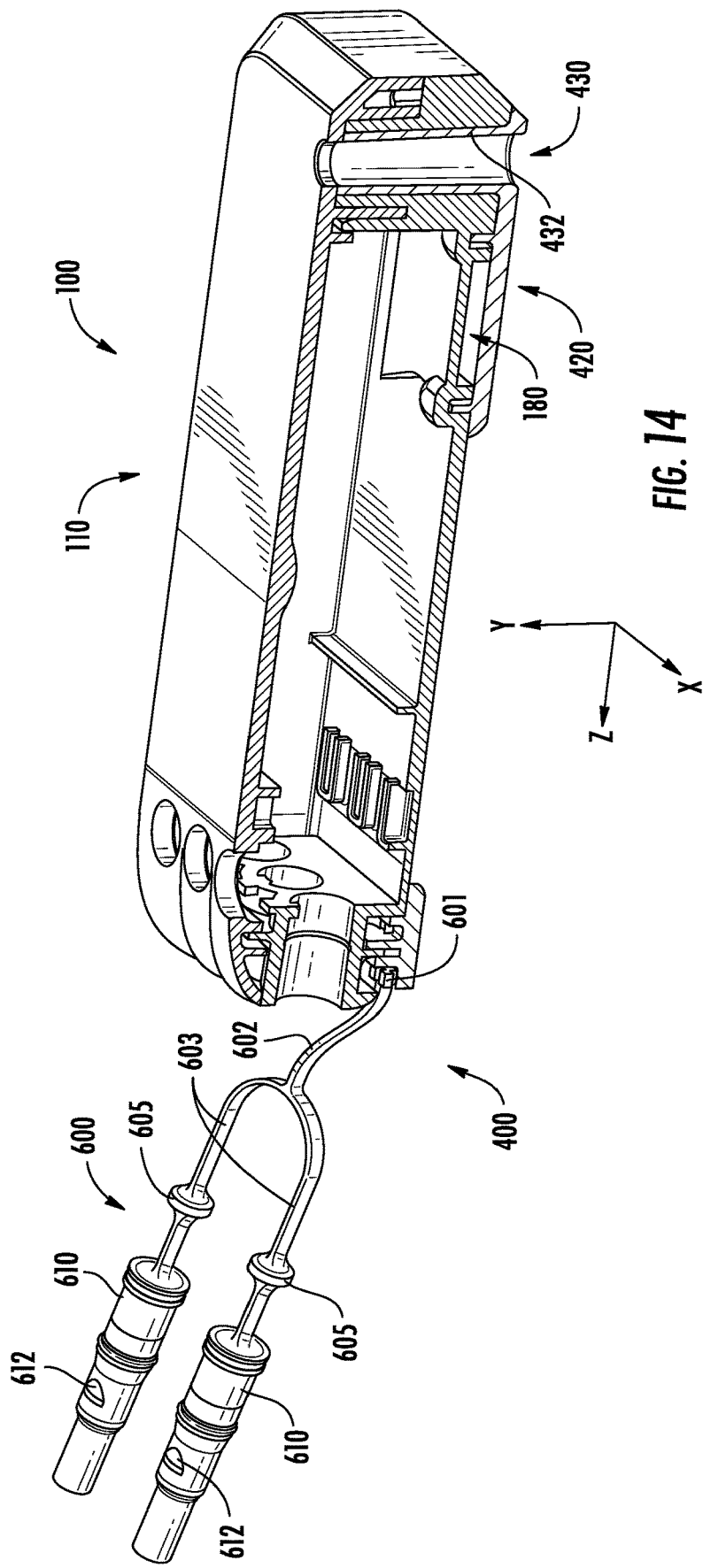
FIG. 14 schematically depicts a section view of the mounting member and multiport assembly along section 14-14 of FIG. 13, according to one or more embodiments shown and described herein.

Referring to FIGS. 13 and 14, an upper perspective view of the multiport assembly 100 and a section view of the multiport assembly 100 along section 14-14 of FIG. 13 are schematically depicted, respectively. In embodiments, the longitudinal member 420 further includes the bushing 432 extending at least partially within the rear shell aperture 109. The longitudinal member 420 may further extend over a lateral slot 180 of the shell 110 such that a strap or band may be positioned between the longitudinal member 420 and the lateral lot 180 may secure the multiport assembly 100 to a utility pole or the like.

In embodiments, the forward tab 410 and the longitudinal member 420 may be coupled to the shell 110 in any suitable manner, for example through adhesive, sealant, welding, overmolding, or the like. In some embodiments, the forward tab 410 and the longitudinal member 420 may be coupled to the shell 110 by a snap-fit or the like. In this embodiment, the mounting member 400 captures a portion of the dust plug tether (such as the end 601) between the mounting member 400 and the shell 110 as depicted in FIGS. 13 and 14. As depicted in FIG. 12, the mounting member 400 has one or more slots 401 for allowing the respective runner 602 of the dust plug tether to pass through, but slot 401 is sized so it captures the larger end 601 of the dust plug tether to inhibit removal or loss of the dust plug 600.

Figure 15:
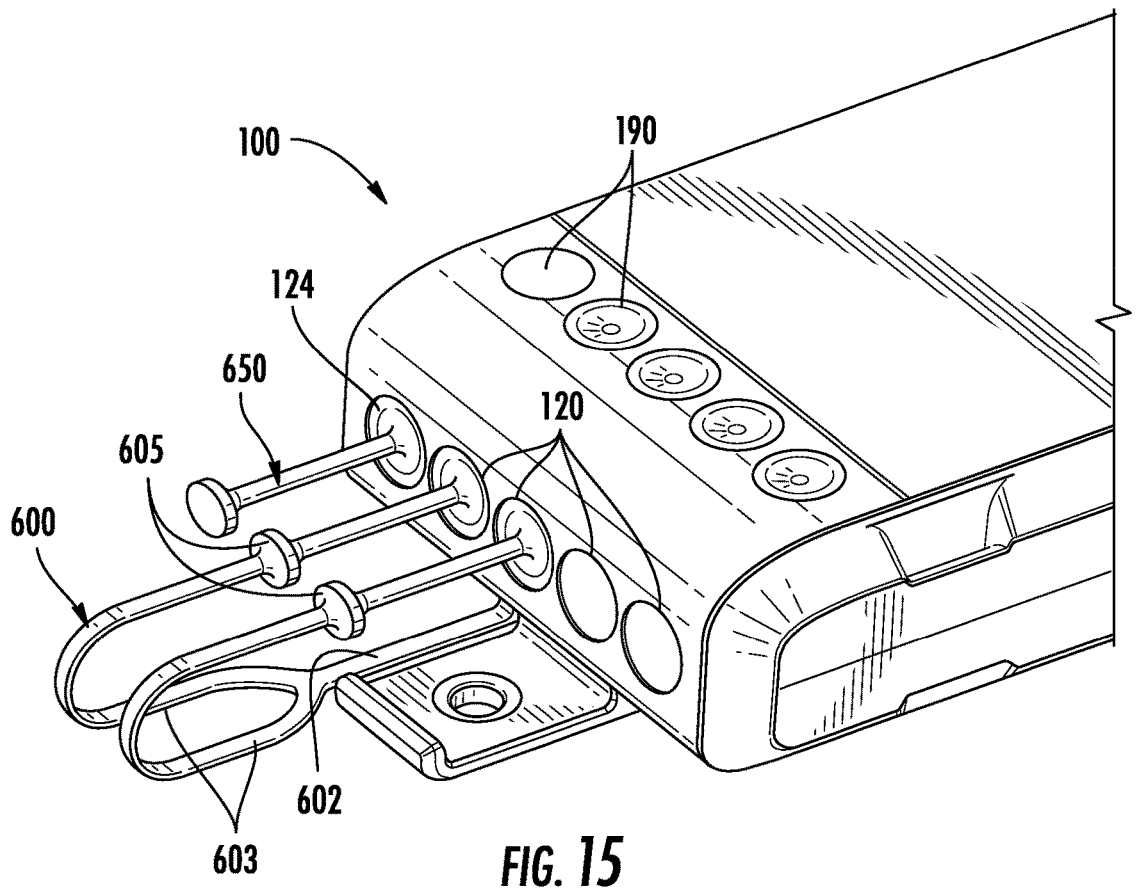
FIG. 15 is a partial front perspective view of the assembled multiport assembly of FIG. 12 showing a first type of dust plug without a tether and a second type of dust plug having a tether inserted into respective optical connector ports of the multiport assembly.

FIG. 15 depicts a front view of the assembled multiport assembly 100 of FIG. 12 with dust plug 650 without a tether inserted into input connector port 124 and the dust plug bodies 610 of dust plug 600 inserted into respective optical connector ports 120. In this embodiment, the input connector port 124 uses a different style of dust plug 650 without a tether compared with dust plug 650 having a tether. As shown, the dust plug tether of dust plug 650 is flexible so it is easily bendable so that it may have a portion that is attached to multiport assembly 100. In either instance, the dust plug 600 and dust plug 650 share similar geometry of a locking feature and keying portion for cooperating with the respective connector ports 120, 124 of the multiport assembly. Using two different styles of dust plugs allows the user to easily identify and distinguish the input connector port 124 from the connector ports 120 for making optical connections toward downstream users in the network.

Figure 17A:
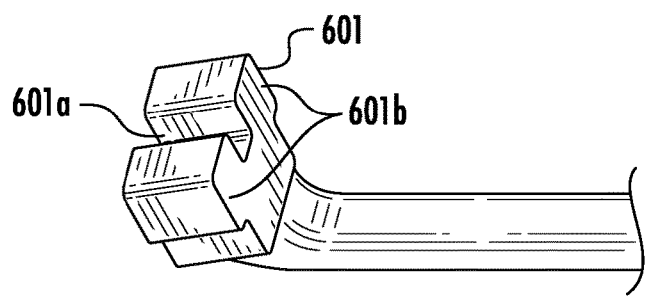
FIG. 17A is a detailed perspective view of the end of dust plug tether of FIGS. 16 and 17.

Further details of dust plug 600 are described with reference to FIGS. 16 and 17, and further details of dust plug 650 are described with reference to FIGS. 18 and 19. FIG. 16 depicts a first perspective view of the dust plug 600 where the locking feature 612 is visible. Locking feature 612 comprises a ramp portion with a ledge. The ramp portion and ledge are integrally formed in the dust plug body 610 and cooperate with a translating securing element associated with the respective connector port 124 to secure the same. Once the dust plug 600 is fully seated in the connector port, the respective push-button 190 needs to be pressed downward to translate the locking feature and allowing the release of the dust plug when pulling on the tether. FIG. 17 depicts a second perspective view of dust plug 600 showing the keying portion 614. Keying portion 614 is a female key and is arranged about 180 degrees from the locking feature 612. The dust plug 600 also comprises a groove for seating a O-ring 625. O-ring 625 is used for sealing the connector port from dust, dirt, debris or the like until the connector port is ready for use. FIG. 17A depicts end 601 of the dust plug tether. As depicted, the end 601 has a slot 601a for positioning the end on a rib of the shell 110 for placement so it aligns with the slot 401 of mounting member 400. End 601 also having a larger flared out portion with protrusions 601b on each side for inhibiting the pullout of the dust plug tether from between the mounting member 400 and shell 110.

Dust plugs 600 provides a flexible dust plug tether so that the dust plug body 610 may be easily positioned as desired such as installing into the connector port 120 or securing the dust plug body to a dust cap of an external plug connector to keep it out of the way, but allow the dust plug to be available for re-insertion into the connector port 120 if needed. The materials and geometry of the dust plug tether aid in determining the flexibility or performance of the dust plug tether. By way of explanation, the dust plug body 610 comprises a first material and the dust plug tether comprises a second material. By using two different materials for the different portions of dust plug 600 the different characteristics and properties may be tailored for the desired functionality. The dust plug tether may comprises a portion that is overmolded about a portion of the dust plug body 610 using two different materials.

For instance, the first material for the dust plug body 610 may be harder than the second material for the dust plug tether. Another characteristic that may be tailored for desired performance between the first and second materials is the flexural modulus. For instance, the flexural modulus for the first material of the dust plug body 600 may be much larger than the flexural modulus of the second material for the dust plug tether. By example, the first material may have a flexural modulus that is 100 times greater than a flexural modulus of the second material. The performance flexibility of the second material may also be selected by hardness in one embodiment the second material has a Shore D hardness in the range of 40-50. One example of a suitable second material for the dust plug tether is a thermoplastic polyester elastomer. Such an example of a thermoplastic polyester elastomer is HYTREL® 4556 available from Dupont Performance Polymers located in Wilmington, DE The dust plug body 610 may be formed from XAREC™ EA357 which is a syndiotactic polystyrene available from Idemitsu Kosan Co., Ltd of Tokyo, Japan or Veradel® AG320 available from Specialty Polymers of Alpharetta, GA.

FIGS. 18 and 19 are perspective views showing details of dust plug 650 shown in the input connector port 124 in FIG. 15. Dust plug 650 is similar to dust plug 600 in that it has a locking feature 612 and keying portion 614, but it may be formed from a single material without a dust plug tether. Instead, dust plug 650 comprises an enlarged end 651 on a pulling grip 651 so it may be easily removed from the input connector port 124 when its respective push-button 190 is depressed. Dust plug 650 may also comprise a groove for a O-ring 625 for sealing the dust cap 650 to the connector port like dust plug 600.

Figure 20:
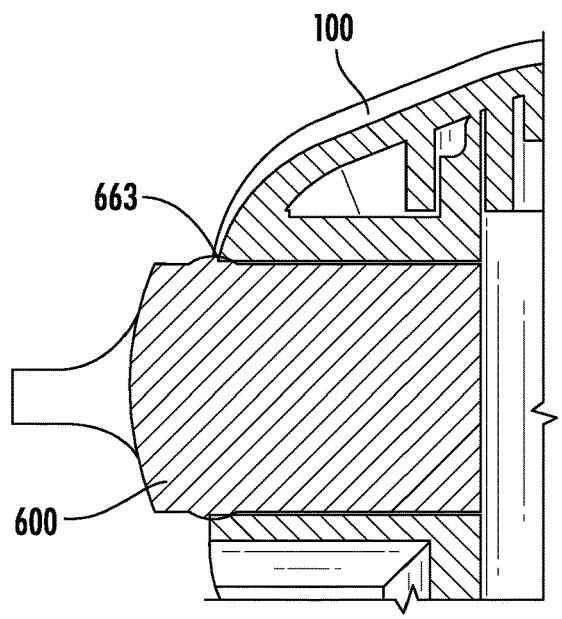
FIGS. 20 and 21 are schematically depict other concepts that may be used with the dust plugs disclosed herein.
Figure 21:
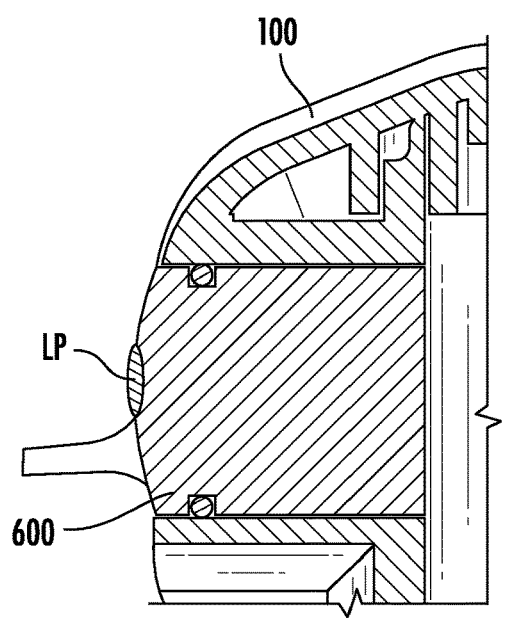

FIGS. 20 and 21 are schematically depict other concepts that may be used with the dust plugs disclosed herein. As shown in FIG. 20, dust plugs 600 or 650 may have one or more slight protruding portions 663 near the interface with the connector port of multiport assembly 100 when inserted therein so that the dust plug body is inhibited from over-insertion and making the dust plug easier to remove. FIG. 21 depicts dust plug 600 or 650 that further comprises a light pipe LP that is in communication with the respective optical fiber of the connector port so that the user may be able to tell if there is an optical connection or a test signal at the respective port.

Figure 22:
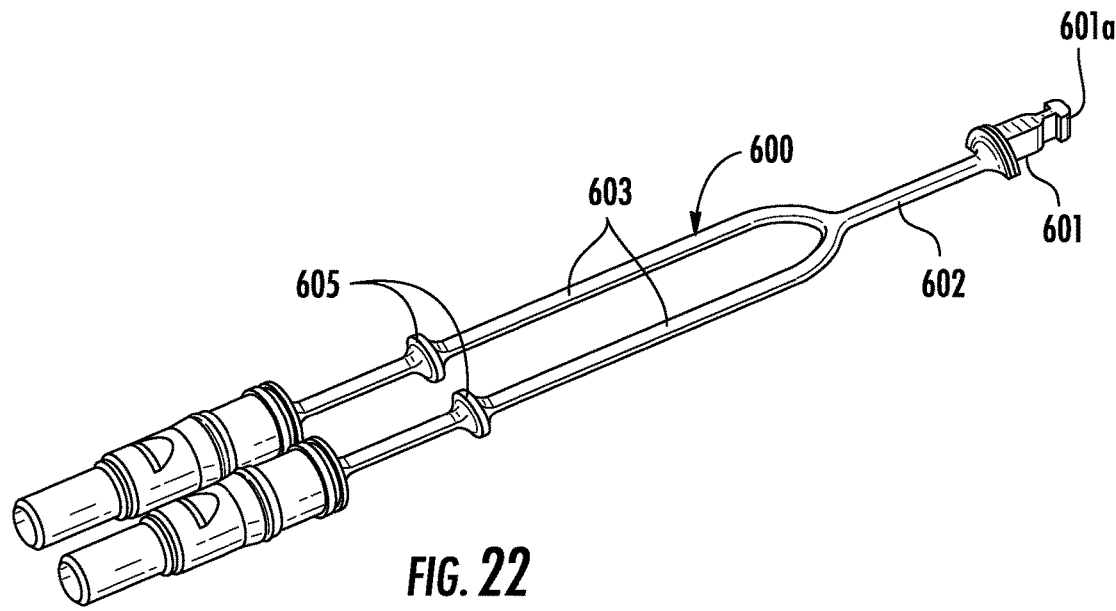
FIGS. 22-24 depict another dust plug having a tether similar to the dust plug of FIGS. 16 and 17.
Figure 23:
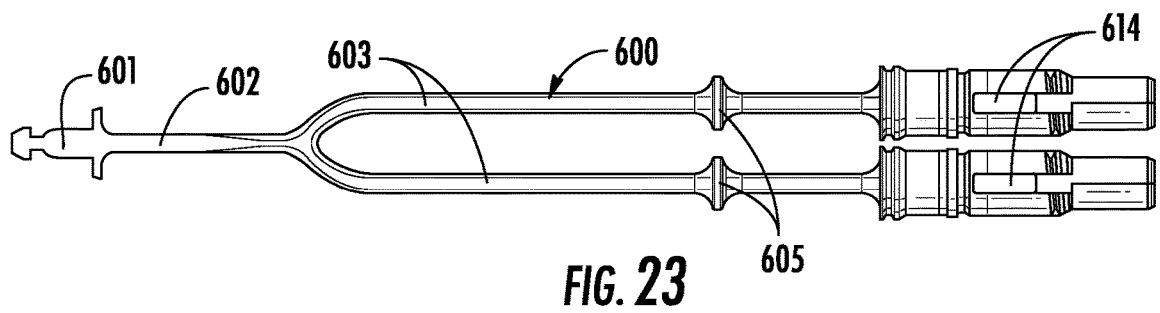
Figure 24:
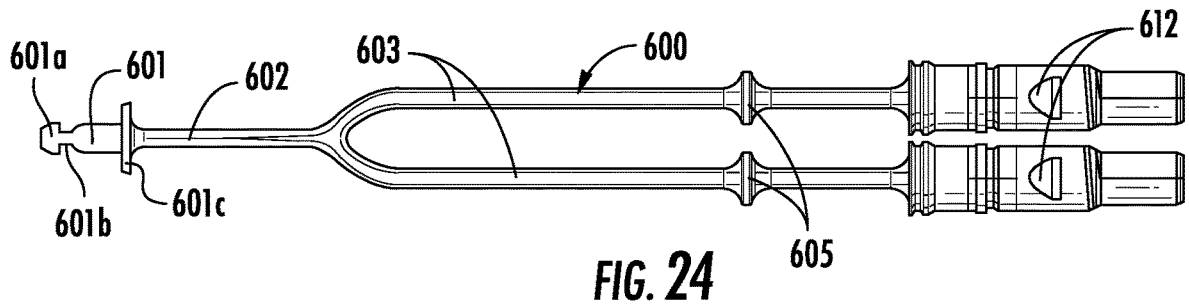
Figure 25:
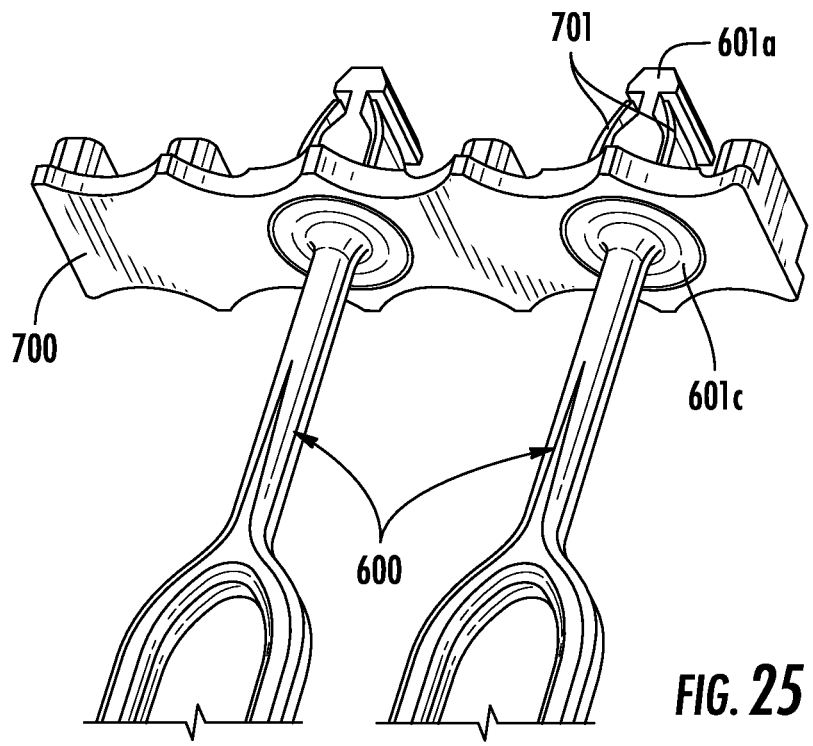
FIGS. 25 and 26 depict the tether of the dust plug of FIGS. 22-24 attached to a faceplate to form a sub-assembly that is suitable for attachment to a multiport assembly.
Figure 26:
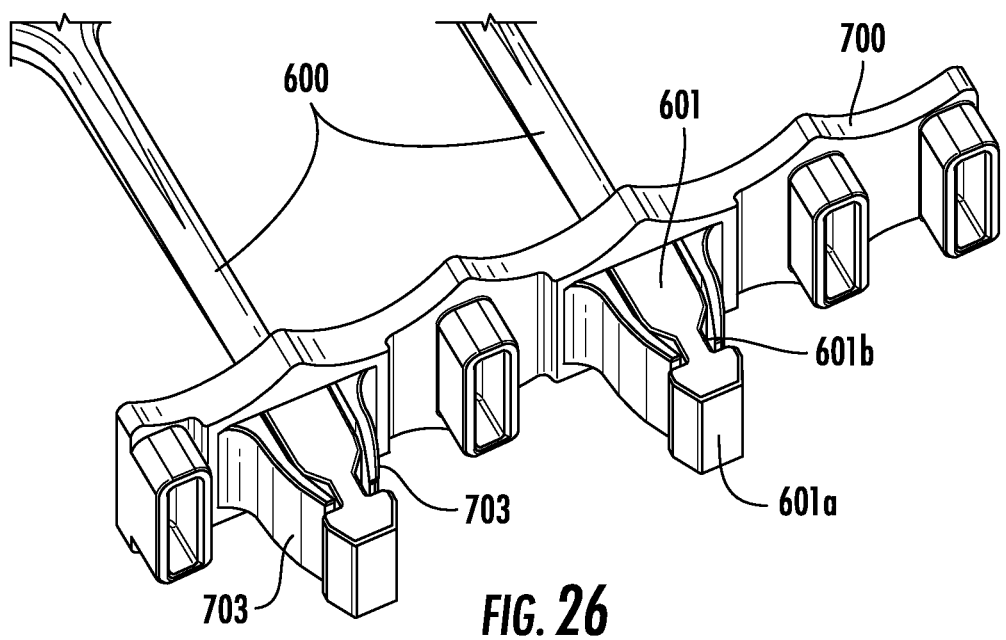

FIGS. 22-24 depict views of another dust plug 600 having a dust plug tether similar to the dust plug shown in FIGS. 16 and 17. In this embodiment, the end 601 of the dust plug 600 has a different configuration for engaging with a faceplate 700 as shown in FIGS. 25 and 26. In this variation, end 601 comprises a head 601a having rearward notches 601b disposed behind the head 601a along with a disc 601c that cooperates with a respective opening 701 in faceplate 700. As best shown in FIGS. 25 and 26 the end 601 of dust plug 600 is inserted into the faceplate 700 until the head 601a protrudes beyond respective latches 703 of the faceplate 700 to inhibit the removal of the dust plug 600 from the faceplate 700. FIG. 27 depicts the tether 600 and faceplate 700 sub-assembly of FIG. 25 attached to multiport assembly 100. In this manner, the faceplate 700 captures a portion of the dust plug tether between the faceplate 700 and shell of the multiport assembly. The faceplate 700 may be attached by welding, adhesive or the like to secure it to the multiport assembly 100.

FIGS. 28 and 29 depict the another variation of dust plug 600 having a tether where the tethers are attached to faceplate 700 in a duplex configuration (i.e., two tethers in one opening 701 of faceplate) to decrease the number of dust plug attachment points on the multiport assembly 100. In this embodiment, the end 601 of each dust plug 600 has a configuration so that two ends 601 cooperate for engaging with the respective opening 701 a faceplate 700 as shown in FIGS. 28 and 29. In this variation, end 601 comprises a head 601a having an L-shape and a half-disc 601c that cooperates with a respective opening 701 in faceplate 700. As best shown in FIG. 29, the ends 601 of dust plug 600 seat into recesses on the backside of faceplate 700, and once installed to inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 30:
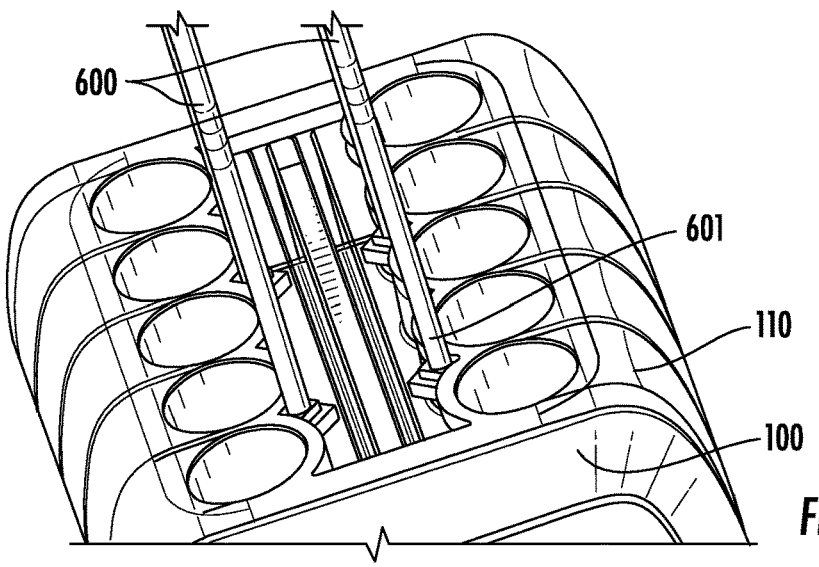
FIGS. 30 and 31 depict a further configuration of a dust plug having tether that uses a faceplate for securing an end of the tether to a multiport assembly.

FIGS. 30 and 31 depict a further configuration of a dust plug 600 having tether that uses a faceplate for securing an end of the tether to a multiport assembly. FIG. 30 depicts the dust plugs 600 having a tether where each end 601 cooperate with the shell 110 for engaging with the respective opening 701 a faceplate 700 as shown in FIG. 31. In this variation, end 601 comprises a head 601a having a diamond shape that is larger than the respective opening 701 in faceplate 700. The ends 601 of dust plugs 600 seat into a portion of shell 100 as shown in FIG. 30 for alignment and recesses on the backside of faceplate 700 inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 32:
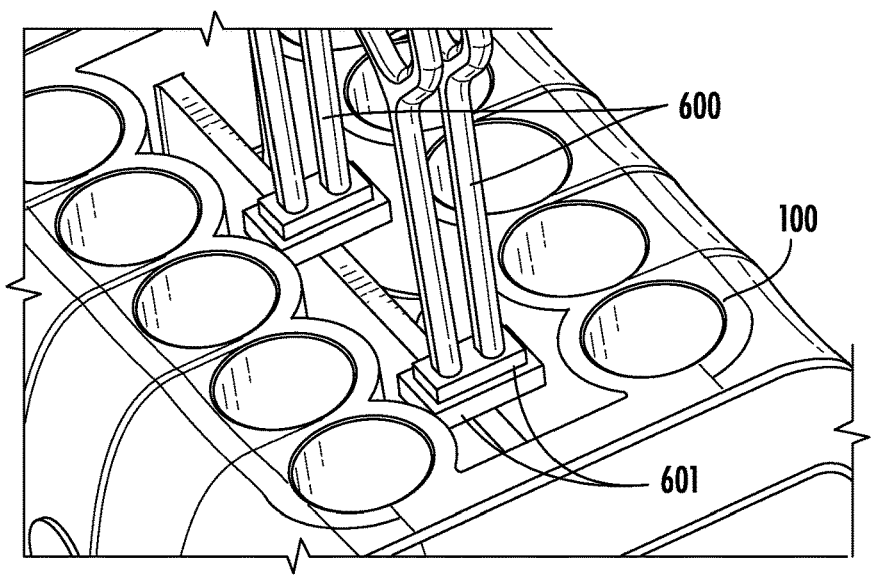
FIGS. 32 and 33 depict another configuration of a dust plug having tether where the tethers use a faceplate for securing an ends of the tethers to a multiport assembly in a duplex configuration.

FIGS. 32 and 33 depict another configuration of a dust plug 600 having tether and faceplate 700 for securing ends 601 of the tethers to a multiport assembly 100 in a duplex configuration. FIG. 32 depicts the dust plugs 600 having a tether where two ends 601 cooperate for engaging with the respective opening 701 a faceplate 700 as shown in FIG. 32. In this variation, end 601 comprises a head 601a having an rectangular shape that cooperates with a respective opening 701 in faceplate 700. The ends 601 of dust plugs 600 seat into recesses on the backside of faceplate 700, and once installed to inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 34:
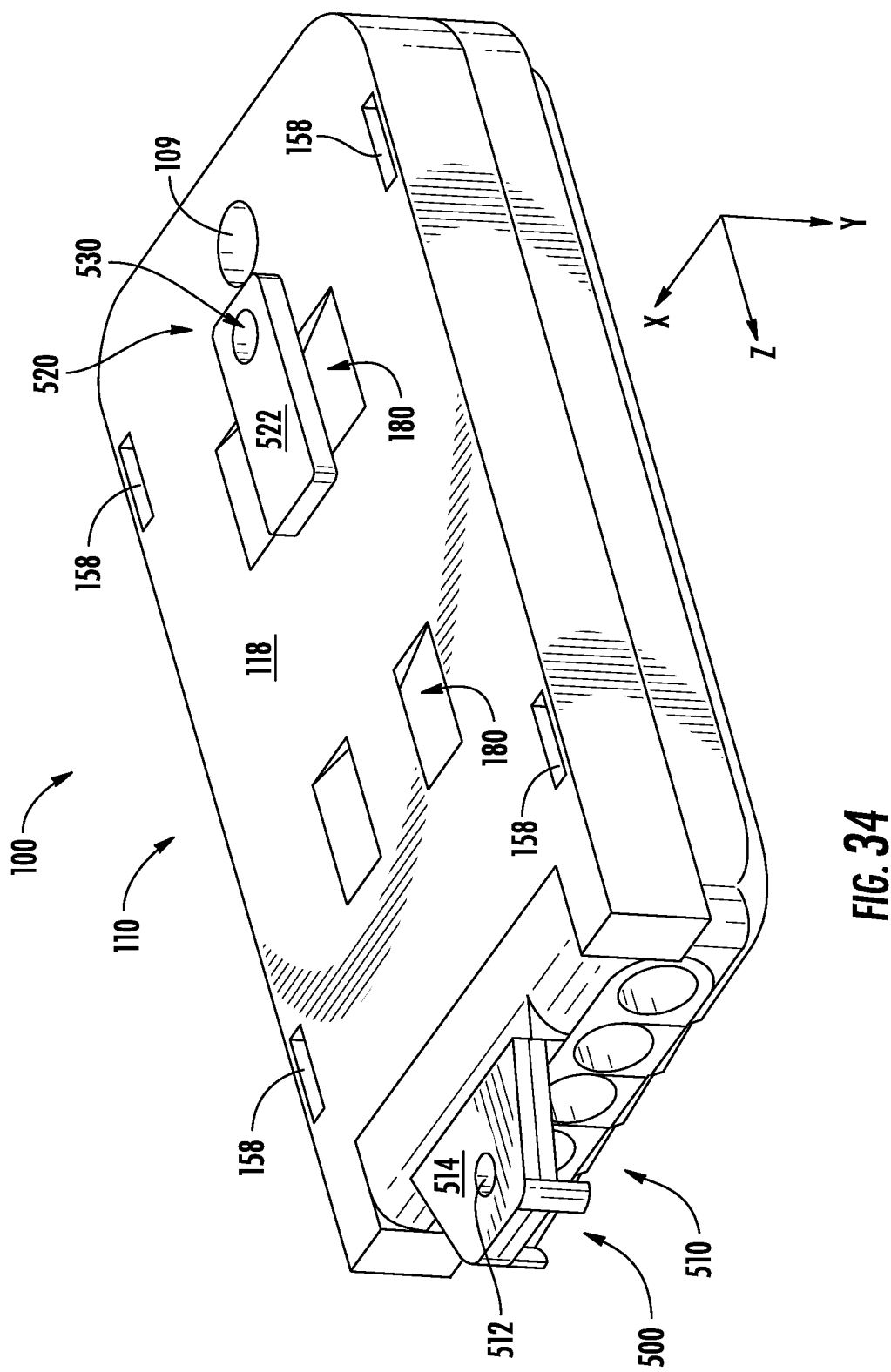
FIG. 34 schematically depicts a lower perspective view of another mounting member assembled to a multiport assembly, according to one or more embodiments shown and described herein.

Referring to FIG. 34, a lower perspective view of a multiport assembly 100 with another mounting member 500 is schematically depicted. Similar to the embodiment described above and depicted in FIGS. 11-14, the mounting member 500 includes the forward tab 510 and the separate longitudinal member 520 spaced apart from the forward tab 510. In the embodiment depicted in FIG. 15, the longitudinal member 520 defines the rear aperture 530, however, the rear aperture 530 is not aligned with the rear shell aperture 109. In embodiments, a fastener may be positioned through the rear aperture 530 of the mounting member 500, and another separate fastener may be positioned through the rear shell aperture 109.

The concepts disclosed allow relatively small multiport assemblies 100 having a relatively high-density of connections along with an organized arrangement for optical connectors 210 attached to the multiport assemblies 100. Shells have a given height H, width W and length L that define a volume for the terminal as depicted in FIG. 1. By way of example, shells 110 of multiport assembly 100 may define a volume of 800 cubic centimeters or less, other embodiments of shells 110 may define the volume of 400 cubic centimeters or less, other embodiments of shells 110 may define the volume of 100 cubic centimeters or less as desired. Some embodiments of multiport assemblies 100 comprise a port width density of at least one connector port 120, 124 per 20 millimeters of width W of the multiport assembly 100. Other port width densities are possible such as 15 millimeters of width W of the terminal. Likewise, embodiments of multiport assemblies 100 may comprise a given density per volume of the shell 110 as desired.

The concepts disclosed allow relatively small form-factors for multiport assemblies as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports with multiport assemblies like FIG. 1 having a linear array of ports with different counts of connector ports 120. As depicted, the respective volumes of the conventional prior art multiports of FIG. 1 with the same port count are on the order of ten times larger than multiport assemblies with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of multiports of the present application are much smaller than the conventional prior art multiports. Of course, the examples of Table 1 are for comparison purposes and other sizes and variations of multiports may use the concepts disclosed herein as desired.

One of the reasons that the size of the multiports may be reduced in size with the concepts disclosed herein is that the cable input device and/or external connectors that cooperate with the multiports have locking features that are integrated into the housing of the optical connector 210. In other words, the locking features for holding the fiber optic connector in the respective port of the terminal are integrally formed in the housing of the connector, instead of being a distinct and separate component such as bayonets or threaded coupling nuts.

In other words, the multiport assemblies 100 avoid the use of bulky structures such as a coupling nut or bayonet used with conventional hardened external connectors that mate to multiport assemblies 100. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which also aids in reducing the size of the multiports disclosed herein.

TABLE 1

Comparison of Conventional Multiport with Multiport Assemblies of Present Application

| Multiport Type | Port Count | Dimension L × W × H (mm) | Volume ($cm^3$) | Normalized Volume Ratio |
| --- | --- | --- | --- | --- |
| Prior Art FIG. 1 | 4 | 274 × 66 × 73 | 1320 | 1.0 |
| | 8 | 312 × 76 × 86 | 2039 | 1.0 |
| | 12 | 381 × 101 × 147 | 5657 | 1.0 |
| Linear | 4 | 76 × 59 × 30 | 134 | 0.10 |
| | 8 | 123 × 109 × 30 | 402 | 0.20 |
| | 12 | 159 × 159 × 30 | 758 | 0.14 |

Accordingly, it should now be understood that embodiments described herein are directed to multiport assemblies including mounting members with standoff features that limit the surface area of the multiport assembly in contact with surface to which the multiport assembly is secured. The standoffs act to space the shell of the multiport assembly apart from the surface, which assists in limiting deformation of the shell as the shell is secured to the surface, thereby assisting in maintaining the structural integrity of the multiport assembly.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

We claim:

1. A multiport assembly comprising:
   a shell extending between a front end and a rear end positioned opposite the front end in a longitudinal direction, the shell defining:
   a cavity; and
   a plurality of optical connector ports positioned at the front end of the shell and extending inward toward the cavity of the shell;
   a plurality of optical adapter assemblies positioned within the cavity of the shell, the plurality of optical adapter assemblies structurally configured to optically couple optical connectors;
   one or more optical fibers disposed within the cavity of the shell and routed from an input to one or more optical adapter assemblies of the plurality of optical adapter assemblies; and
   a mounting member coupled to the shell, the mounting member defining:
   an aperture extending through the mounting member; and
   at least one standoff that extends outward from a lower surface of the shell.

2. The multiport assembly of claim 1, further comprising a second mounting member comprising an aperture and a standoff portion, and wherein the shell defines a rear shell aperture that receives a portion of the second mounting member.

3. The multiport of claim 1, wherein the input comprises an input connector port or an input tether.

4. The multiport assembly of claim 1, further comprising a dust plug having a locking feature and a keying portion.

5. The multiport assembly of claim 4, the dust plug further comprises a dust plug body attached to a dust plug tether.

6. A multiport assembly comprising:
   a shell extending between a front end and a rear end positioned opposite the front end in a longitudinal direction, the shell defining a cavity and a plurality of optical connector ports positioned at the front end of the shell and extending inward toward the cavity of the shell;

a plurality of optical adapter assemblies positioned within the cavity of the shell, the plurality of optical adapter assemblies associated with the plurality of optical connector ports and structurally configured to optically couple optical connectors;

one or more optical fibers disposed within the cavity of the shell and routed from an input to one or more optical adapter assemblies of the plurality of optical adapter assemblies; and a dust plug comprising a locking feature and a keying portion.

7. The multiport assembly of claim 6, the dust plug further comprises a dust plug body attached to a dust plug tether.

8. The multiport assembly of claim 7, further comprising a faceplate or a mounting member, wherein the faceplate or the mounting member captures a portion of the dust plug tether between the faceplate and the shell or the mounting member or the shell.

9. The multiport assembly of claim 7, further comprising a mounting member coupled to the shell, the mounting member defining an aperture extending through the mounting member, and at least one standoff that extends outward from the lower surface of the shell.

10. The multiport assembly of claim 7, wherein the input comprises an input connector port or an input tether.

11. The multiport assembly of claim 7, wherein the dust plug tether further comprises a gripping portion disposed between the dust plug body and an end of the dust plug tether.

12. The multiport assembly of claim 7, wherein the dust plug body comprises a first material and the dust plug tether comprises a second material.

13. The multiport assembly of claim 12, wherein the first material is harder than the second material.

14. The multiport assembly of claim 12, wherein the first material has a flexural modulus that 100 times greater than a flexural modulus of the second material.

15. The multiport assembly of claim 12, wherein the second material has a Shore D hardness in the range of 40-50.

16. The multiport assembly of claim 12, wherein the second material is a thermoplastic polyester elastomer.

17. The multiport assembly of claim 7, wherein the dust plug comprises a plurality of dust plug bodies attached to respective legs of the dust plug tether.

18. The multiport assembly of claim 7, wherein the dust plug tether comprises a portion that is overmolded about a portion of the dust plug body.

19. The multiport assembly of claim 7, further comprising a second mounting member comprising an aperture and a standoff portion, and wherein the shell defines a rear shell aperture that receives a portion of the second mounting member.

20. The multiport assembly of claim 7, the plurality of optical adapter assemblies being associated with respective push-button members for translating a locking feature.

21. The multiport assembly of claim 7, further comprising a splitter positioned within the cavity of the shell.

22. The multiport assembly of claim 6, further comprising a mounting member coupled to the shell, the mounting member defining an aperture extending through the mounting member, and at least one standoff that extends outward from the lower surface of the shell, and wherein the dust plug further comprises a dust plug body attached to a dust plug tether, and the mounting member captures a portion of the dust plug tether between the mounting member and the shell.

23. A multiport assembly comprising:
a shell extending between a front end and a rear end positioned opposite the front end in a longitudinal direction, the shell defining:
a cavity; and
a plurality of optical connector ports positioned at the front end of the shell and extending inward toward the cavity of the shell;
a plurality of optical adapter assemblies positioned within the cavity of the shell, the plurality of optical adapter assemblies structurally configured to optically couple optical connectors; and
a mounting member coupled to the shell, the mounting member defining:
an aperture extending through the mounting member; and
at least one standoff that extends outward from a lower surface of the shell.

24. The multiport assembly of claim 23, wherein the shell further defines a slot positioned on the lower surface of the shell, and wherein the mounting member is positioned at least partially within the slot of the lower surface of the shell.

25. The multiport assembly of claim 24, wherein:
the slot of the shell defines a bottom face, a sidewall extending between the bottom face and the lower surface of the shell, and a tab that extends over the bottom face to define a channel bounded by the bottom face, the sidewall, and the tab;
the mounting member defines a slot engagement tab extending outward from the mounting member; and;
the slot engagement tab of the mounting member is positioned within the channel of the shell.

26. The multiport assembly of claim 25, wherein the slot of the shell defines more than one tab extending over the bottom face of the slot, and the slot further defines a cutout positioned between the more than one tab in the longitudinal direction, wherein the sidewall extends between the bottom face of the slot and the lower surface of the shell in the vertical direction at the cutout.

27. The multiport assembly of claim 23, wherein the shell defines a latch recess positioned on the lower surface of the shell and comprising a latch engagement face that is oriented to face forward in the longitudinal direction, and the mounting member comprises a latch comprising a multiport engagement face oriented to face rearward in the longitudinal direction and that is engaged with the latch engagement face.

28. The multiport assembly of claim 27, wherein the latch of the mounting member comprises a latch tab and the multiport engagement face extends outward from the latch tab, and the latch further comprises a ramp extending between the multiport engagement face and the latch tab.

29. The multiport assembly of claim 28, wherein the latch tab extends beyond the shell in the longitudinal direction.

30. The multiport assembly of claim 23, wherein the shell defines a lateral slot positioned on the lower surface of the shell.

31. The multiport assembly of claim 30, wherein the mounting member comprises a longitudinal member that extends at least partially over the lateral slot and wherein the longitudinal member defines the at least one standoff.

32. The multiport assembly of claim 31, wherein the mounting member further comprises a forward tab that is integral with the longitudinal member.

33. The multiport assembly of claim 31, wherein the mounting member further comprises a forward tab that is separate and spaced apart from the longitudinal member.

34. The multiport assembly of claim 33, wherein the forward tab defines a standoff that is spaced apart from the lower surface of the shell and the longitudinal member defines a standoff that is spaced apart from the lower surface of the shell.

35. The multiport assembly of claim 31, wherein the shell defines a rear shell aperture positioned at the rear end of the shell, and the longitudinal member defines the aperture extending through the longitudinal member and aligned with the rear shell aperture.

36. The multiport assembly of claim 35, wherein the longitudinal member comprises a bushing that is positioned at least partially within the rear shell aperture.

37. The multiport assembly of claim 23, further comprising a splitter positioned within the cavity of the shell and a plurality of optical fibers extending between the splitter and the plurality of optical adapter assemblies.

38. The multiport assembly of claim 23, further comprising an input tether comprising a plurality of optical fibers connected with corresponding optical adapter assemblies of the plurality of optical adapter assemblies.

39. A method for securing a multiport assembly to a surface, the method comprising:
positioning a fastener through an aperture of a mounting member and installing the mounting member to the surface, wherein the mounting member comprises a standoff engaged with the surface and an outward face that is spaced apart from the standoff and the surface;
aligning a slot engagement tab of the mounting member with a cutout defined by a slot of a shell of the multiport assembly;
sliding the multiport assembly with respect to the mounting member to position the slot engagement tab within a channel bounded by a bottom face, a sidewall, and a tab of the slot of the shell; and
engaging a latch of the mounting member with a latch recess defined by the shell of the multiport assembly.

40. The method of claim 39, wherein engaging the latch of the mounting member comprises engaging a multiport engagement face of the latch with a latch engagement face of the latch recess, wherein the multiport engagement face and the latch engagement face are oriented to face in opposing directions.

41. The method of claim 39, further comprising engaging an endface of the mounting member with an endface of the slot, wherein the endface of the mounting member and the endface of the slot are oriented to face in opposing directions.

42. The method of claim 39, further comprising engaging a ramp of the latch of the mounting member with the shell to move the latch outward and away from the shell.

43. A multiport assembly comprising:
a shell extending between a front end and a rear end positioned opposite the front end in a longitudinal direction, the shell defining:
a cavity;
a plurality of optical connector ports positioned at the front end of the shell and extending inward toward the cavity of the shell; and
a rear shell aperture;
a plurality of optical adapter assemblies positioned within the cavity of the shell, the plurality of optical adapter assemblies structurally configured to optically couple optical connectors;
one or more optical fibers disposed within the cavity of the shell and routed from an input to one or more optical adapter assemblies of the plurality of optical adapter assemblies;
a mounting member coupled to the shell, the mounting member comprising an aperture extending through the mounting member, and at least one standoff that extends outward from a lower surface of the shell; and
a second mounting member comprising an aperture and a standoff portion, and wherein the rear shell aperture receives a portion of the second mounting member.

44. The multiport of claim 43, wherein the input comprises an input connector port or an input tether.

\* \* \* \* \*